US012001949B2

United States Patent
Trygg et al.

(10) Patent No.: US 12,001,949 B2
(45) Date of Patent: *Jun. 4, 2024

(54) COMPUTER-IMPLEMENTED METHOD, COMPUTER PROGRAM PRODUCT AND SYSTEM FOR DATA ANALYSIS

(71) Applicant: Sartorius Stedim Data Analytics AB, Umea (SE)

(72) Inventors: Johan Trygg, Umea (SE); Rickard Sjoegren, Umea (SE)

(73) Assignee: SARTORIUS STEDIM DATA ANALYTICS AB, Umeå (SE)

( * ) Notice: Subject to any disclaimer, the term of this patent is extended or adjusted under 35 U.S.C. 154(b) by 1242 days.

This patent is subject to a terminal disclaimer.

(21) Appl. No.: 16/122,008

(22) Filed: Sep. 5, 2018

(65) Prior Publication Data

US 2020/0074269 A1    Mar. 5, 2020

(51) Int. Cl.
*G06N 3/088*    (2023.01)
*G06F 17/18*    (2006.01)
(Continued)

(52) U.S. Cl.
CPC ............... *G06N 3/08* (2013.01); *G06F 17/18* (2013.01); *G06F 18/214* (2023.01); *G06F 18/22* (2023.01);
(Continued)

(58) Field of Classification Search
CPC ............................................. G06N 3/02–049
(Continued)

(56) References Cited

U.S. PATENT DOCUMENTS 10,229,356 B1 * 3/2019 Liu .................... G10L 15/16
10,997,499 B1    5/2021 Kayyoor et al.
(Continued)

FOREIGN PATENT DOCUMENTS

CN    104881684    9/2015
CN    107655850    2/2018
(Continued)

OTHER PUBLICATIONS

Liu et al. "Neural networks with enhanced outlier rejection ability for off-line handwritten word recognition", 2002, Pattern Recognition 35.*

(Continued)

*Primary Examiner* — Daniel T Pellett
(74) *Attorney, Agent, or Firm* — Klarquist Sparkman, LLP

(57) ABSTRACT

A computer-implemented method for data analysis is provided. A deep neural network (100) is provided for processing images and at least a part of a training dataset used for training the deep neural network, the deep neural network comprising a plurality of hidden layers, the training dataset including possible observations that can be input to the deep neural network; obtaining first sets of intermediate output values that are output from at least one of the plurality of hidden layers, each of the first sets of intermediate output values obtained by inputting a different one of the possible input images included in said at least the part of the training dataset; constructing a latent variable model using the first sets of intermediate output values, the latent variable model providing a mapping of the first sets of intermediate output values to first sets of projected values in a sub-space that has a dimension lower than a dimension of the sets of the intermediate outputs; receiving an observation to be input to the deep neural network; obtaining a second set of interme- (Continued)

diate output values that are output from said at least one of the plurality of hidden layers by inputting the received observation to the deep neural network; mapping, using the latent variable model, the second set of intermediate output values to a second set of projected values; and determining whether or not the received observation is an outlier with respect to the training dataset based on the latent variable model and the second set of projected values.

14 Claims, 19 Drawing Sheets

(51) Int. Cl.
| | |
|---|---|
| G06F 18/214 | (2023.01) |
| G06F 18/22 | (2023.01) |
| G06N 3/04 | (2023.01) |
| G06N 3/08 | (2023.01) |
| G06N 3/10 | (2006.01) |
| G06N 7/00 | (2023.01) |
| G06N 20/00 | (2019.01) |
| G06V 10/74 | (2022.01) |
| G06V 10/764 | (2022.01) |

(52) U.S. Cl.
CPC ............... *G06N 3/04* (2013.01); *G06N 3/088* (2013.01); *G06N 3/10* (2013.01); *G06N 7/00* (2013.01); *G06N 20/00* (2019.01); *G06V 10/761* (2022.01); *G06V 10/764* (2022.01)

(58) Field of Classification Search
USPC ...................................................... 706/15–25
See application file for complete search history.

(56) References Cited

U.S. PATENT DOCUMENTS

| | | | |
|---|---|---|---|
| 11,062,229 | B1* | 7/2021 | Mnih ..................... G06N 20/00 |
| 11,868,887 | B2 | 1/2024 | Kandemir et al. |
| 2013/0338965 | A1 | 12/2013 | Ide et al. |
| 2013/0339202 | A1 | 12/2013 | Zhao et al. |
| 2014/0365195 | A1 | 12/2014 | Lahiri et al. |
| 2016/0063393 | A1 | 3/2016 | Ramage et al. |
| 2019/0287230 | A1 | 9/2019 | Lu et al. |
| 2020/0020098 | A1* | 1/2020 | Odry .................... G06K 9/6244 |
| 2021/0011791 | A1 | 1/2021 | Okanohara et al. |
| 2021/0041953 | A1 | 2/2021 | Poltorak |
| 2021/0334656 | A1 | 10/2021 | Sjogren et al. |
| 2021/0350113 | A1 | 11/2021 | Sjogren et al. |

FOREIGN PATENT DOCUMENTS

| | | |
|---|---|---|
| CN | 107655850 A | 2/2018 |
| CN | 107967515 | 4/2018 |
| CN | 108445752 | 8/2018 |
| KR | 10-2018-0064905 | 6/2018 |
| WO | 9706418 A1 | 2/1997 |
| WO | WO 97/06418 | 2/1997 |

OTHER PUBLICATIONS

Goldberger et al. "Neighborhood Component Analysis", 2004, Advances in Neural Information Processing Systems 17.*
Said et al. "Data Preprocessing for Distance-based Unsupervised Intrusion Detection", 2011, Ninth Annual International Conference on Privacy, Security and Trust.*
Yu et al. "Recursive Principal Component Analysis-Based Data Outlier Detection and Sensor Data Aggregation in loT Systems", 2017, IEEE Internet of Things Journal, vol. 4. No. 6.*
Guo et al. "An Anomaly Detection Framework Based on Autoencoder and Nearest Neighbor", Jul. 2018, 15th International Conference on Service Systems and Service Management.*
Christopher Bishop "Latent Variable Models", 1999, Learning in Graphical Models, M. I. Jordan (Ed.), MIT Press, pp. 371-403.*
Manash Kuman Mandal, "Implementing PCA, Feedforward and Convolutional Autoencoders and using it for Image Reconstruction, Retrieval, & Compression." Jan. 9, 2018, Manash's Blog, retrieved from: https://blog.manash.io/implementing-pca-feedforward-and-convolutional-autoencoders-and-using-it-for-image-reconstruction.*
Lakshminarayanan et al. "Simple and Scalable Predictive Uncertainty Estimation using Deep Ensembles," 2017, 31st Conference on Neural Information Processing Systems.*
Teyeh et al., "Baysian Uncertainty Estimation for Batch Normalized Deep Networks", Under review as a conference paper at ICLR 2018, ARXIVL 80206455 STAT, Feb. 2018, 27 pages.
Ilg et al., "Uncertainty Estimates and Multi-Hypotheses Networks for Optical Flow", arXiv: 1802.07095v4 [cs.CV], Dec. 20, 2018, 30 pages.
Gal et al., "Dropout as a Bayesian Approximation: Representing Model Uncertainty in Deep Learning", Proc. of the 33rd Int'l Conf on Machine Learning, arXiv:1506.02142x6 [stat.ML], Oct. 4, 2016, 12 pages.
Blundell et al., "Weight Uncertainty in Neutral Networks", Proc. of the 32nd Int'l Conf on Machine LearningarXiv: 1505-05424v2 [stat.ML], May 21, 2015, 10 pages.
Lakshminarayanan et al., "Simple and Scalable Predictive Uncertainty Estimation using Deep Ensembles", Advances in Neural Information Processing Systems, arXiv: 1612.01474v3 [stat.ML], Nov. 4, 2017, 15 pages.
Saxena et al., International Conference on Prognostics and Health Management, 2008, PHM 2008, Oct. 2008, IEEE, article "Damage propagation modeling for aircraft engine run-to-failure simulation", pp. 1-10.
Hochreiter et al., "Long Short-Term Memory", Neutral Computation vol. 9, No. 8, 1997, pp. 1735-1780.
Gers et al., "Learning to Forget: Continual Prediction with LSTM", Neural Computation 12, pp. 2451-2471 (2000).
Kingma et al., "ADAM: A Method for Stochastic Optimization", Published as a conference paper at ICLR 2015, Jan. 30, 2017, pp. 1-15.
Latecki et al., "Outlier Detection with Kernel Density Functions", Machine Learning and Data Mining in Pattern Recognition, Jul. 2007, pp. 61-75.
Gal et al., "Dropout as a Bayesian Approximation: Representing Model Uncertainty in Deep Learning", Proceedings of the 33rd International Conference on Machine Learning, Oct. 4, 2016, 12 pages.
Anonymous Authors: "Bayesian Uncertainty Estimation for Batch Normalized Deep Networks", ARXIVL 80206455 STAT, ICLR 2018, Feb. 2018, 27 pages.
Lakshminarayanan, et al., "Simple and Scalable Predictive Uncertainty Estimation using Deep Ensembles", 31st Conference on Neural Information Processing Systems, Nov. 4, 2017, 15 pages.
Osband et al., " Deep exploration via bootstrapped DQN", Advances in Neural Information Processing Systems, Jul. 2016, pp. 4026-4034.
Ilg et al., "Uncertainty Estimates and Multi-Hypotheses Networks for Optical Flow", Feb. 2018, 30 pages.
Blundell et al., "Weight Uncertainty in Neutral Networks", Proceedings of the 32nd International Conference on Machine Learning, (2015), May 21, 2015, 10 pages.
Ritter et al., "A Scalable Laplace Approximation for Neural Networks", ICLR 2018, Feb. 2018, 15 pages.
Jenatton et al., "Structured Sparse Principal Component Analysis", Proceedings of the13th International Conference on Artificial Intelligence and Statistics, vol. 9, Mar. 2010, 8 pages.
Dasgupta, "Experiments with Random Projection", Uncertainty in Artificial Intelligence Proceedings 2000, Jun. 2000, pp. 143-151.
Kingma et al., "Auto-Encoding Variational Bayes", ARXIV Preprint ARXIV:1312.6114 2013, May 2014, 14 pages.
Makhzani et al., "k-Sparse Autoencoders", International Conference on Learning Representations, ICLR, 2014, Mar. 2014, 9 pages.

(56) References Cited

OTHER PUBLICATIONS

Li et al., "Transforming Cooling Optimization for Green Data Center via Deep Reinforcement Learning", (2017), Jul. 2018, 11 pages.
Lazarevic et al., "Feature Bagging for Outlier Detection", Proceedings of the Eleventh ACM SIGKDD International Conference on Knowledge Discovery in Data Mining, Aug. 2005, pp. 157-166.
Wold et al., "Principal Component Analysis", Chemometrics and Intelligent Laboratory Systems, vol. 2, No. 1, (1987), pp. 37-52.
Wold et al., "PLS-regression: a basic tool of chemometrics", Chemometrics and Intelligent Laboratory Systems, vol. 58, No. 2 (2001), pp. 109-130.
Xiao et al., "Fasion-MNIST: a Novel Image Dataset for Benchmarking Machine Learning Algorithms", https://trends.google.com/trends/explore?data-all&q=mnist,CIFAR,ImageNet, Aug. 2017, 6 pages.
Lecun et al., "The MNIST Database of handwritten digits", Jun. 21, 2018, 9 pages, URL:http://yann.lecun.com/exdb/mnist.
Rousseeuw, "Least Median of Squares Regression", Journal of the American Statistical Association, Dec. 1984, vol. 79, No. 388, pp. 871-880.
Rousseeuw, "Multivariate Estimation With High Breakdown Point", Mathematical Statistics and Applications, (1985), pp. 283-297.
Deng et al., "ImageNet: A Large-Scale Hierarchical Image Database", 2009 IEEE Conference on Computer Vision and Pattern Recognition, 2009, pp. 248-255.
Szegedy et al., "Rethinking the inception architecture for computer vision", Proceedings of the IEEE Conference on Computer Vision and Pattern Recognition, 2016, pp. 2818-2826.
Lin et al., "Network In Network", ARXIVL 3124400 CS, Dec. 2013, pp. 1-10.
Breunig et al., "LOF: Identifying Density-Based Local Outliers", Proceedings of The 2000 ACM SIGMOD International Conference on Management of Data, 2000,, pp. 93-104.
Achlioptas, "Database-friendly random projections: Johnson-Lindenstrass with binary coins", Journal of Computer and System Sciences 66 (2003) pp. 671-687.
International Search Report received in PCT/EP2019/073670, Dec. 4, 2019, 3 pages.
Written Opinion received in PCT/EP2019/073670, Dec. 4, 2019, 6 pages.
European Search Report received in EP Application No. 18192649. 4, Mar. 6, 2019, 8 pages.
European Search Report received in EP Application No. 19180972. 2, Dec. 13, 2019, 7 pages.
International Search Report received in PCT/EP2019/073695, Dec. 4, 2019, 3 pages.
Written Opinion received in PCT/EP2019/073695, Dec. 4, 2019, 5 pages.
Office Action (w/English translation) received in related Japan Application No. 2021-512919, mailed on Jul. 26, 2022, 8 pages.
Dewa Made Sri Arsa et al., "Improving Principal Component Analysis Performance for Reducing Spectral Dimension in Hyperspectral Image Classification," 2018 International Workshop on Big Data and Information Security (IWBIS) IEEE, May 13, 2018, pp. 123-128, 6 pages.
Office Action (w/o English translation) issued in Chinese Application No. 201980058094.9, Sep. 23, 2023, 7 pages. English Portion Only.
Office Action (w/o English translation) issued in Chinese Application No. 201980058085.X, Sep. 29, 2023, 8 pages. English Portion Only.

* cited by examiner

COMPUTER-IMPLEMENTED METHOD, COMPUTER PROGRAM PRODUCT AND SYSTEM FOR DATA ANALYSIS

FIELD OF THE INVENTION

The application relates to a computer-implemented method, a computer program product and a system for data analysis, in particular, outlier detection in unstructured data.

BACKGROUND

A deep neural network may be an artificial neural network having an input layer, an output layer and a plurality of hidden layers between the input and output layers. Deep learning using deep neural networks has become very popular in many applications thanks to powerful transformations learned by deep neural networks. When adopting deep learning in critical systems such as autonomous cars, diagnostic applications or in power plant control systems, however, it may be crucial to understand when predictions provided by the deep learning system should not be trusted. In other words, it may be important to know not only whether or not a prediction provided by the deep learning system is accurate, but also whether the deep learning system should predict at all. Autonomous decisions can be improved by understanding the limits of the learned representations and by recognizing when data not recognized by the deep learning system is encountered.

Many different methods have been proposed to allow deep neural networks to describe uncertainty in predictions. Many of these methods are based on training deep neural networks to perform Bayesian inference rather than point inferences during prediction. This means that rather than predicting a single point, the networks are trained to predict a distribution of possible points. The intuition is that observations the model cannot explain will have a broad distribution, or large uncertainty. One popular solution to perform Bayesian prediction is so called Monte-Carlo dropout (MC-dropout), disclosed in Y. Gal and Z. Gharamani, "Dropout as a Bayesian approximation: Representing model uncertainty in deep learning," in International Conference on Machine Learning, 2016, pp. 1050-1059. MC-dropout can be applied to neural networks that are trained using "dropout", a regularization technique for reducing overfitting in neural networks by dropping out (or in other words, ignoring) some units (e.g., neurons, nodes) in a neural network during the training phase. MC-dropout makes multiple inferences for each prediction, using so called Monte-Carlo sampling for prediction, while eliminating, or dropping out, network neurons randomly during prediction time. The different predictions vary due to dropout and describe a prediction distribution. The prediction uncertainty can then be quantified by calculating the entropy or variance of the resulting distribution.

Other methods for using dropout producing Monte-Carlo samples include: sampling based on batch-normalization parameters (M. Teye, H. Azizpour, and K. Smith, "Bayesian Uncertainty Estimation for Batch Normalized Deep Networks," ArXiv180206455 Stat, February 2018), prediction from different models in an ensemble (B. Lakshminarayanan, A. Pritzel, and C. Blundell, "Simple and scalable predictive uncertainty estimation using deep ensembles," in Advances in Neural Information Processing Systems, 2017, pp. 6405-6416), multiple "prediction heads" in a shared base network (I. Osband, C. Blundell, A. Pritzel, and B. Van Roy, "Deep exploration via bootstrapped DQN," in Advances in Neural Information Processing Systems, 2016, pp. 4026-4034; E. Ilg et al., "Uncertainty Estimates for Optical Flow with Multi-Hypotheses Networks," ArXiv180207095 Cs, February 2018), variational inference of weight distribution instead of regular point weights (C. Blundell, J. Cornebise, K. Kavukcuoglu, and D. Wierstra, "Weight uncertainty in neural networks," ArXiv Prepr. ArXiv150505424, 2015) and Laplace approximation of distribution from existing weights (H. Ritter, A. Botev, and D. Barber, "A Scalable Laplace Approximation for Neural Networks," February 2018).

However, these methods may constrain how the network is constructed or trained, and/or rely on multiple inferences per prediction. This may limit their general applicability for real-time systems where making multiple inferences is impractical and/or for existing systems that do not fit into the constraints.

SUMMARY

According to an aspect, methods, systems, and computer readable media are provided to efficiently evaluate reliability of a prediction given by a deep neural network for an observation input to the deep neural network.

According to an aspect, a computer-implemented method for data analysis is provided. The method includes:
  obtaining a deep neural network for processing data and at least a part of a training dataset used for training the deep neural network, the deep neural network comprising a plurality of hidden layers, the training dataset including possible observations that can be input to the deep neural network;
  obtaining first sets of intermediate output values that are output from at least one of the plurality of hidden layers, each of the first sets of intermediate output values obtained by inputting a different one of the possible observations included in said at least the part of the training dataset;
  constructing a latent variable model using the first sets of intermediate output values, the latent variable model providing a mapping of the first sets of intermediate output values to first sets of projected values in a sub-space that has a dimension lower than a dimension of the sets of the intermediate outputs;
  receiving an observation to be input to the deep neural network;
  obtaining a second set of intermediate output values that are output from said at least one of the plurality of hidden layers by inputting the received observation to the deep neural network;
  mapping, using the latent variable model, the second set of intermediate output values to a second set of projected values; and
  determining whether or not the received observation is an outlier with respect to the training dataset based on the latent variable model and the second set of projected values.

When the received observation is determined to be an outlier, it may be assumed that a prediction (e.g., an output) given by the deep neural network for the received observation is less reliable than in case the received observation is determined to be a non-outlier.

In various embodiments and examples described herein, the data to be processed by the deep neural network may be unstructured data. Unstructured data may be understood as data that either does not have a pre-defined data model or is not organized in a pre-defined manner. Unstructured data may have internal structure but is not structured via pre-defined data models or schema. Examples of unstructured data may include, but are not limited to, images, audio, videos, sensor data and texts.

In some specific examples, the data to be processed by the deep neural network may be sensor data obtained from one or more sensors, such as, temperature sensor, acceleration sensor, pressure sensor, strain gauge, force sensor, microphone, image sensor, etc. Each of the possible observations included in the test dataset and the received observation may contain sensor data obtained by the one or more sensors at a point in time or during a period of time.

In case the sensor data is obtained by image sensors, the data to be processed by the deep neural network may be images. In the present disclosure, an image may include a 2D array of pixels. Each of the pixels may include at least one value. For example, a pixel in a greyscale image may include one value indicating an intensity of the pixel. A pixel in a color image may include multiple values, for example three values, that indicate coordinates in a color space such as RGB color space. In case images are processed by the deep neural network, each of the observations included in the test dataset and the received observation may contain an image.

In the present disclosure, the term "deep neural network" may be understood as an artificial neural network having an input layer, an output layer and a plurality of hidden layers provided between the input layer and the output layer. A hidden layer of a neural network may also be referred to as an "intermediate layer". Thus, an output from the hidden layer may be referred to as an "intermediate output". Further, an output from the hidden layer may include a plurality of values, each of which corresponds to a node included in the hidden layer. Accordingly, the term "set of intermediate output values" as used herein may indicate an output of a hidden layer, including a plurality of values that are output from respective nodes of the hidden layer.

In some examples, the "deep neural network" in the present disclosure may be a feedforward neural network having a plurality of hidden layers. In a feedforward neural network, connections between nodes do not form a cycle. A specific example of a feedforward deep neural network may be a convolutional neural network (CNN) that is commonly applied to analyzing visual imagery.

In some other examples, the "deep neural network" in the present disclosure may be a recurrent neural network where connections between nodes form a directed graph along a sequence. A specific example of a recurrent deep neural network may be Long-Short Term Memory (LSTM) which can process sequential data.

In the present disclosure, the term "latent variable model" may be a statistical model that relates a set of observable variables to a set of latent variables. In various embodiments and examples described herein, a (first or second) "set of intermediate output values" may be considered as the set of observable variables for the latent variable model. Further, in various embodiments and examples described herein, a "set of projected values" may be considered as the set of latent variables for the latent variable model.

In some examples, in the method according to the above-stated aspect, the latent variable model may be constructed according to principal component analysis.

In the present disclosure, the term "principal component analysis", also referred to as PCA, may be understood as indicating a statistical procedure that uses an orthogonal transformation to convert a set of observations of possibly correlated variables into a set of values of linearly uncorrelated variables called principal components.

Variants of PCA include but are not limited to: sparse PCA (Jenatton, R., Obozinski, G., & Bach, F. (2010, March). Structured sparse principal component analysis. In *Proceedings of the Thirteenth International Conference on Artificial Intelligence and Statistics* (pp. 366-373)). Alternatives to PCA include but are not limited to: random projections (Dasgupta, S. (2000, June). Experiments with random projection. In *Proceedings of the Sixteenth Conference on Uncertainty in Artificial Intelligence* (pp. 143-151). Morgan Kaufmann Publishers Inc.); sparse random projections (Achlioptas, D. (2003). Database-friendly random projections: Johnson-Lindenstrauss with binary coins. *Journal of Computer and System Sciences*, 66(4), 671-687.); very sparse random projections (Li, P., Hastie, T. J., & Church, K. W. (2006, August). Very sparse random projections. In *Proceedings of the 12th ACM SIGKDD International Conference on Knowledge Discovery and Data Mining* (pp. 287-296). ACM); and self-organizing maps (Kohonen, T. (1998). The self-organizing map. *Neurocomputing*, 21(1-3), 1-6.)

In some other examples, in the method according to the above-stated aspect, the latent variable model may be constructed using an autoencoder. An "autoencoder" may be a type of artificial neural network used to learn efficient data codings in an unsupervised manner. One form of an autoencoder may be a feedforward, non-recurrent neural network having an input layer, an output layer and one or more hidden layers connecting them, with the output layer having the same number of nodes as the input layer, and with the purpose of reconstructing its own inputs. Different types of autoencoders include but are not limited to variational autoencoders (Kingma, D. P., & Welling, M. (2013). Auto-encoding variational bayes. *arXiv preprint arXiv:1312.6114.*), and sparse autoencoders (Makhzani, A., & Frey, B. (2013). K-sparse autoencoders. *arXiv preprint arXiv:1312.5663.*).

Further, in the method according to the above-stated aspect, said step of determining whether or not the received observation is an outlier may comprise:

a. calculating a Mahalanobis distance of the second set of projected values with respect to a distribution of the first sets of projected values; and b. determining that the received observation is an outlier with respect to the training dataset if the calculated Mahalanobis distance is larger than a threshold value for the Mahalanobis distance.

The threshold value for the Mahalanobis distance may be determined based on Mahalanobis distances, each of which may be calculated for a different one of the first sets of projected values with respect to the distribution of the first sets of projected values.

In the present disclosure, the term "Mahalanobis distance" may be understood as indicating a known measure of the distance between a point P (e.g., corresponding to an observation) and a distribution D. More specifically, the "Mahalanobis distance" measures how many standard deviations away an observation is from the origin in a multivariate probability distribution.

Further, in the method according to the above-stated aspect, wherein said step of determining whether or not the received observation is an outlier may comprise:

determining an approximate set of intermediate output values corresponding to the second set of intermediate output values, using the latent variable model and the second set of projected values;

calculating a squared approximation residual for the second set of intermediate output values and the approximate set of intermediate output values; and determining that the received observation is an outlier with respect to the training dataset if the calculated squared approximation residual is larger than a threshold value for the squared approximation residual.

The threshold value for the squared approximation residual may be determined based on squared approximation residuals, each of which may be calculated for a different one of the first sets of intermediate output values and an approximate set of intermediate output values corresponding to said one of the first sets of intermediate output values.

In the present disclosure, the term "squared approximation residual" may be understood as indicating a sum of squares of residuals, where a residual is a difference between an observed value and an approximated value provided by the latent variable model.

Further, in the method according to the above-stated aspect, the steps of obtaining the first sets of intermediate output values and constructing the latent variable model may be performed for two or more of the plurality of hidden layers;

wherein the steps of obtaining the second set of intermediate output values and mapping the second set of intermediate output values to the second set of projected values may be performed concerning said two or more of the plurality of hidden layers; and wherein, the step of determining whether or not the received observation is an outlier may be performed based on the latent variable model and the second sets of projected values obtained concerning said two or more of the plurality of hidden layers.

How well the method according to the above-stated aspect can distinguish outliers and non-outliers may be evaluated using, for example, the Receiver-Operating Characteristic Area-Under-Curve (ROC-AUC) metric. For instance, when the Mahalanobis distance and/or the squared approximation residual is/are calculated for determining whether or not the received observation is an outlier, the ROC curves may be calculated by comparing how well the Mahalanobis distances and/or the squared approximation residuals separate outliers from non-outliers. Other metrics which may be used to evaluate the method include but are not limited to: (1) precision, which is a fraction of observations identified as outliers by the system that actually are outliers; (2) recall, which is a fraction of all outliers that are successfully identified as outliers by the system; (3) F1-score, which is a harmonic mean of precision and recall; and (4) accuracy, which is a fraction of correct identifications by the system out of all identifications.

According to another aspect, a further computer implemented method is provided. The method comprises:

obtaining a deep neural network for processing data and at least a part of a training dataset used for training the deep neural network, the deep neural network comprising a plurality of hidden layers, the training dataset including possible observations that can be input to the deep neural network;

obtaining first sets of intermediate output values that are output from at least one of the plurality of hidden layers, each of the first sets of intermediate output values obtained by inputting a different one of the possible observations included in said at least the part of the training dataset;

constructing a latent variable model using the first sets of intermediate output values, the latent variable model providing a mapping of the first sets of intermediate output values to first sets of projected values in a sub-space that has a dimension lower than a dimension of the sets of the intermediate outputs; and storing the latent variable model and the first sets of projected values in a storage medium.

The further computer implemented method according to the other aspect as stated above may further comprise:

receiving an observation to be input to the deep neural network;

obtaining a second set of intermediate output values that are output from at least one of the plurality of hidden layers by inputting the received observation to the deep neural network;

mapping, using the latent variable model, the second set of intermediate output values to a second set of projected values; and determining whether or not the received observation is an outlier with respect to the training dataset based on the latent variable model and the second set of projected values.

According to yet another aspect, a yet further computer-implemented method is provided. The method comprises:

receiving an observation to be input to a deep neural network for processing data, the deep neural network having a plurality of hidden layers and trained using a training data set that includes possible observations that can be input to the deep neural network;

obtaining a second set of intermediate output values that are output at least from one of the plurality of hidden layers by inputting the received observation to the deep neural network;

mapping, using a latent variable model stored in a storage medium, the second set of intermediate output values to a second set of projected values; and determining whether or not the received observation is an outlier with respect to the training dataset based on the latent variable model and the second set of projected values, wherein the latent variable model stored in the storage medium is constructed by:

obtaining first sets of intermediate output values that are output from said one of the plurality of hidden layers, each of the first sets of intermediate output values obtained by inputting a different one of the possible observations included in said at least the part of the training dataset; and constructing the latent variable model using the first sets of intermediate output values, the latent variable model providing a mapping of the first sets of intermediate output values to first sets of projected values in a sub-space that has a dimension lower than a dimension of the sets of the intermediate outputs.

According to yet another aspect, a computer program product is provided. The computer program product comprises computer-readable instructions that, when loaded and run on a computer, cause the computer to perform the method according to any one of the above-stated aspects.

According to yet another aspect, a system for data analysis is provided. The system comprises:

a storage medium storing a training dataset used for training a deep neural network, the deep neural network comprising a plurality of hidden layers, the training dataset including possible observations that can be input to the deep neural network; and processor configured to:
obtain the deep neural network trained using the training dataset;
obtain at least a part of the training dataset stored in the storage medium;
obtain first sets of intermediate output values that are output from at least one of the plurality of hidden layers, each of the first sets of intermediate output values obtained by inputting a different one of the possible observations included in said at least the part of the training dataset;
construct a latent variable model using the first sets of intermediate output values, the latent variable model providing a mapping of the first sets of intermediate output values to first sets of projected values in a sub-space that has a dimension lower than a dimension of the sets of the intermediate outputs;
receive an observation to be input to the deep neural network;
obtain a second set of intermediate output values that are output from said at least one of the plurality of hidden layers by inputting the received observation to the deep neural network;
map, using the latent variable model, the second set of intermediate output values to a second set of projected values; and
determine whether or not the received observation is an outlier with respect to the training dataset based on the latent variable model and the second set of projected values.

In the system according to the above-stated aspect, the latent variable model may be constructed according to principal component analysis.

In the system according to the above-stated aspect, for determining whether or not the received observation is an outlier, the processor may be further configured to:
calculate a Mahalanobis distance of the second set of projected values with respect to a distribution of the first sets of projected values; and
determine that the received observation is an outlier with respect to the training dataset if the calculated Mahalanobis distance is larger than a threshold value for the Mahalanobis distance.

In the system according to the above-stated aspect, for determining whether or not the received observation is an outlier, the processor may be further configured to:
determine an approximate set of intermediate output values corresponding to the second set of intermediate output values, using the latent variable model and the second set of projected values;
calculate a squared approximation residual for the second set of intermediate output values and the approximate set of intermediate output values; and
determine that the received observation is an outlier with respect to the training dataset if the calculated squared approximation residual is larger than a threshold value for the squared approximation residual.

In the system according to the above-stated aspect, the processor may be further configured to:
perform the steps of obtaining the first sets of intermediate output values and constructing the latent variable model for two or more of the plurality of hidden layers;
perform the steps of obtaining the second set of intermediate output values and mapping the second set of intermediate output values to the second set of projected values concerning said two or more of the plurality of hidden layers; and
perform the step of determining whether or not the received observation is an outlier based on the latent variable model and the second sets of projected values obtained concerning said two or more of the plurality of hidden layers.

According to various aspects and examples stated above, outliers in input images with respect to the training dataset can be efficiently detected, as less assumptions of how the deep neural network is constructed may be necessary and sampling may not be required. Further, according to various aspects and examples stated above, an already learned data representation may be used for outlier detection. In contrast to separate outlier detection models, the same representation used for prediction can be used for detection of outliers.

The subject matter described in the application can be implemented as a method or as a system, possibly in the form of one or more computer program products. The subject matter described in the application can be implemented in a data signal or on a non-transitory machine readable medium, where the medium is embodied in one or more information carriers, such as a CD-ROM, a DVD-ROM, a semiconductor memory, or a hard disk. Such computer program products may cause a data processing apparatus to perform one or more operations described in the application.

In addition, subject matter described in the application can also be implemented as a system including a processor, and a memory coupled to the processor. The memory may encode one or more programs to cause the processor to perform one or more of the methods described in the application. In some examples, the system may be a general purpose computer system. In other examples, the system may be a special purpose computer system including an embedded system.

BRIEF DESCRIPTION OF THE DRAWINGS

Details of one or more implementations are set forth in the exemplary drawings and description below. Other features will be apparent from the description, the drawings, and from the claims. It should be understood, however, that even though embodiments are separately described, single features of different embodiments may be combined to further embodiments.

DETAILED DESCRIPTION OF EMBODIMENTS

In the following text, a detailed description of examples will be given with reference to the drawings. It should be understood that various modifications to the examples may be made. In particular, one or more elements of one example may be combined and used in other examples to form new examples.

System Configuration

Figure 1:
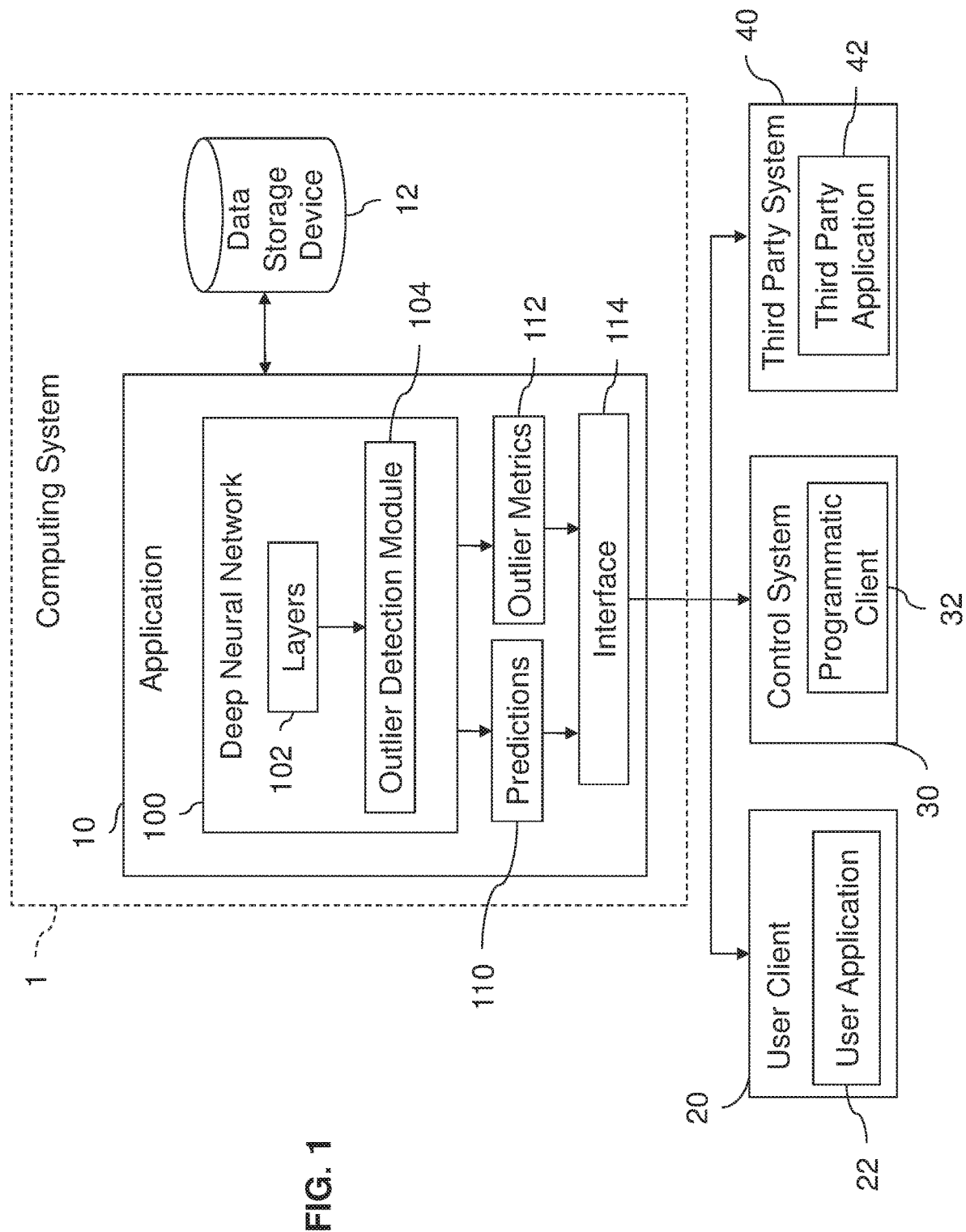
FIG. 1 shows an example of a system including the system according to the present disclosure.

FIG. 1 shows an example of a system including the system according to the present disclosure.

The system shown in FIG. 1 may comprise a computing system 1, a user client 20, a control system 30 and a third party system 40.

The computing system 1 may provide the system for data analysis, according to the present disclosure. The computing system 1 may be implemented using one or more general purpose computers, for example. As shown in FIG. 1, the computing system 1 may comprise an application 10 and a data storage device 12.

The application 10 may be implemented by a software application including instructions that cause a computer to perform exemplary processes of the computing system as will be described later in more detail. As shown in FIG. 1, the application 10 may comprise a deep neural network 100, predictions 110, outlier metrics 112 and an interface 114.

The deep neural network (hereinafter, also referred to as "DNN") 100 may be an artificial neural network having an input layer, an output layer and a plurality of hidden layers in between the input and output layers. The deep neural network 100 may be trained for processing images, using a training dataset including possible input images to the deep neural network 100. The training dataset may be stored in the data storage device 12 accessible by the application 10. In the example of FIG. 1, the deep neural network 100 may include layers 102 and an outlier detection module 104.

The layers 102 may include an input layer (not shown), an output layer (not shown) and a plurality of hidden layers (not shown) provided between the input layer and the output layer.

The outlier detection module 104 may be connected to at least one of the plurality of hidden layers of the deep neural network 100 and be configured to determine whether or not an observation is an outlier with respect to the training dataset used for training the deep neural network 100. The details of the process performed by the outlier detection module 104 will be described later.

Figure 2:
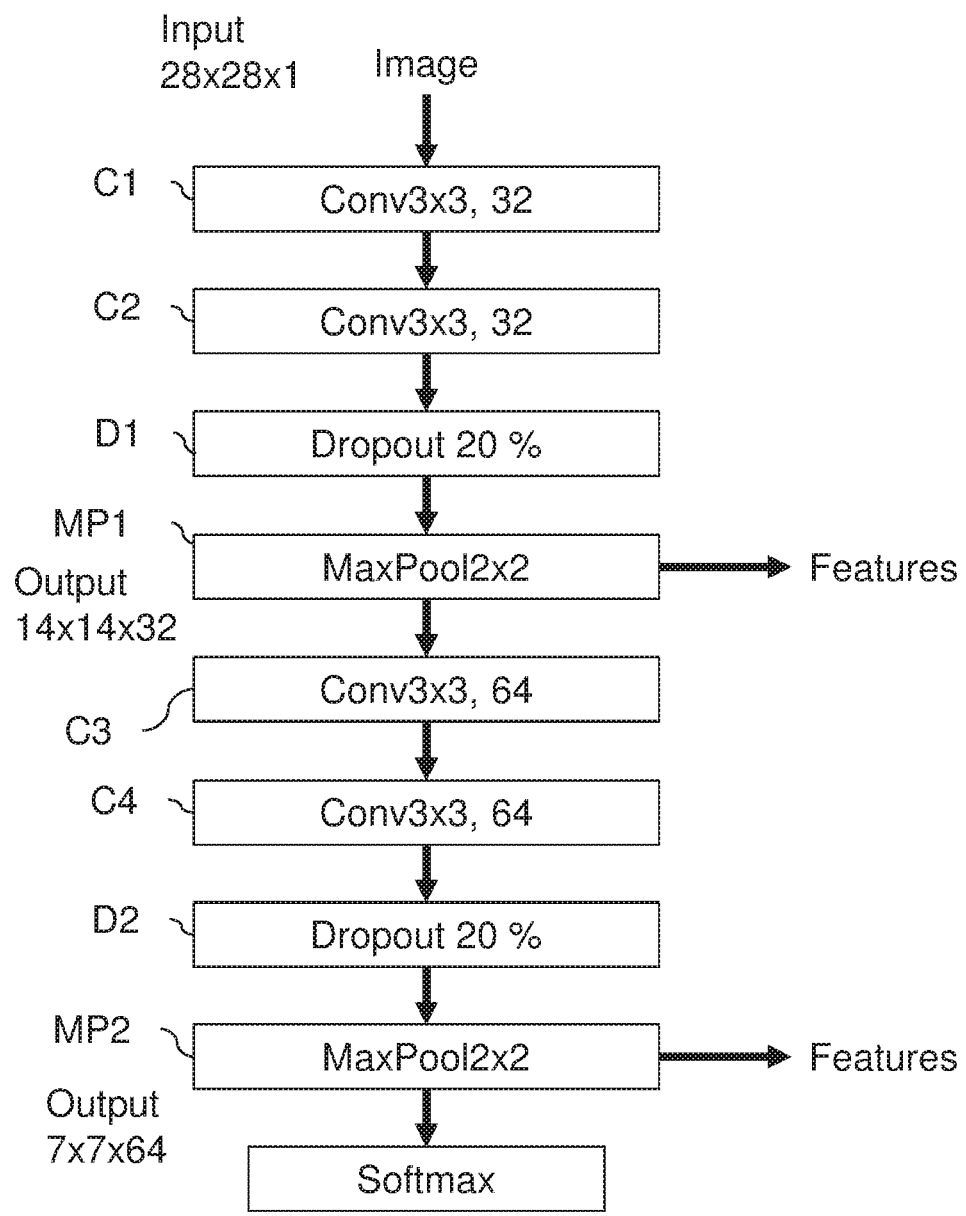
FIG. 2 shows an exemplary configuration of a convolutional neural network (CNN) for processing images.

FIG. 2 shows a specific example of the deep neural network 100. The exemplary deep neural network shown in FIG. 2 is a convolutional neural network (CNN) for classifying images. For example, the exemplary CNN shown in FIG. 2 may classify input images into a number of different categories. In another example, the exemplary CNN shown in FIG. 2 may determine whether or not an input image belongs to a particular category. In any case, the exemplary CNN shown in FIG. 2 may be configured to receive a greyscale image of 28×28 pixels as an input image. Each pixel of the input image may include a value indicating an intensity of the pixel. The intensity value of each pixel of the input image may be considered as an input value to an input node of an input layer of the exemplary CNN. The exemplary CNN shown in FIG. 2 comprises four convolutional layers C1, C2, C3, C4, two max pool layers MP1, MP2 and an output layer with a softmax function as the activation function of nodes included in the output layer.

While the above example uses a 28×28 pixel image, from a theoretical perspective, there is no upper limit on the size of the image. However, increasing the image size may also increase computational demands. In general, the image size selected for the application of interest may reflect a trade-off between a desired level of detail and computational demands. In typical classification applications, images may range from 200×200 pixels to 300×300 pixels. However, applications are not limited to this range, and may be smaller than 200×200 pixels or greater than 300×300 pixels.

Each node included in the convolutional layer C1 of the exemplary CNN may correspond to a filter of size 3×3 (pixels), applied to a particular part of the input image and may output a value resulting from applying the filter to the particular part of the input image. In the example of FIG. 2, 32 filters are applied to the input image at the convolutional layer C1. Each of the 32 filters may be applied to the whole area of the input image by sliding the filter with a stride of S pixel(s) in both width and height directions of the input image. For each location of the 32 filters on the input image, 32 nodes corresponding to the 32 filters may be present in the convolutional layer C1. In the example of FIG. 2, the stride S may be set to 1 pixel. The output of the convolutional layer C1 may thus include 28×28×32 values, which may be considered as 32 images of 28×28 pixels. The output of the convolutional layer C1 may be input to the convolutional layer C2. The convolutional layer C2 may have a configuration analogous to the convolutional layer C1 with 32 filters of size 3×3. Accordingly, the output of the convolutional layer C2 may also include 28×28×32 values, which may be considered as 32 images of 28×28 pixels.

The output of the convolutional layer C2 may be subject to 20% of dropout (see D1 of FIG. 2). In other words, 20% of the values (corresponding to nodes) in the output of the convolutional layer C2 may be randomly selected and disregarded.

After the dropout operation D1, the output of the convolutional layer C2 may be further subject to down-sampling by a max-pooling operation at the first max pool layer MP1. The max pooling operation may select the maximum value among a plurality of input values. In the example of FIG. 2, the max pool layer MP1 may apply filters having a size of 2×2 may be applied, with a stride of 2 pixels, to each of the 32 images with 28×28 pixels output from the convolutional layer C2. This may result in 32 output images including 14×14 pixels each of which has the maximum intensity value among the pixels of the corresponding image (output from the convolutional layer C2) within the corresponding filter. Each filter used in the max pooling operation may be considered as a node of the max pool layer MP1.

The output from the max pool layer MP1 may be provided to the convolutional layer C3, having a configuration analogous to that of the convolutional layers C1, C2, but applying 64 filters. The output of the convolutional layer C3 may be provided to the convolutional layer C4, having an analogous configuration as the convolutional layer C3, with 64 filters of size 3×3. Further, the output of the convolutional layer C4 may be subject to 20% of dropout (see D2 of FIG. 2) and then subject to the max-pooling operation at the max pool layer MP2 in a manner analogous to that at the max pool layer MP1 as stated above. The output of the max pool layer MP2 may include 7×7×64 values.

Finally, the output of the max pool layer MP2 may be provided to the output layer with a softmax function. The output layer may include one or more output nodes corresponding to one or more groups (or categories) into which the input image may be classified. While this example refers to specific parameters (e.g., a number of filters, a dropout percentage, number of convolutional layers, stride, etc.), the methods and systems are not limited to these embodiments, as a range of values for each parameter is contemplated herein.

In some examples, concerning the exemplary CNN shown in FIG. 2, the outputs from the max pool layers MP1 and MP2 may be provided to the outlier detection module 104 (FIG. 1) for detecting whether or not the input image is an outlier with respect to the training dataset used for training the exemplary CNN shown in FIG. 2. For instance, the outlier detection module 104 may construct, for each of the max pool layers MP1 and MP2, a latent variable model using the outputs from the respective max pool layers MP1 and MP2 for possible input images in the training dataset. The latent variable model may provide a mapping of the outputs of the max pool layer MP1 or MP2 to sets of projected values in a sub-space that has a dimension lower than a dimension of the outputs of the max pool layer MP1 or MP2. The constructed latent variable model may be used for determining whether or not an input image (e.g., a newly obtained input image that is not included in the training dataset) is an outlier with respect to the training dataset. In more general terms, the outlier detection module 104 may be configured to obtain outputs from one (or more) of the hidden layers of the deep neural network 100 and construct the latent variable model using the obtained outputs.

Referring again to FIG. 1, the predictions 110 may be outputs from the deep neural network 100. In some examples, the predictions 110 may indicate which category the input image is classified into by the deep neural network 100.

The outlier metrics 112 may include metrics for determining whether an input image is an outlier with respect to the training dataset used for training the deep neural network 100. The details of the outlier metrics 112 will be described later below.

The interface 114 may be an interface for the application 10 to communicate with various devices that may be provided outside the computing system 1. For example, the interface 114 may be configured to communicate information generated by the application 10 to those devices. Further, for example, the interface 114 may be configured to receive information directed to the application 10 from those devices.

The data storage device 12 may be configured to store data that is used by the application 100. Although FIG. 1 shows the data storage device 12 to be a part of the computing system 1, in some examples, the data storage device 12 may be provided outside the computing system, as long as the data stored in the data storage device 12 is accessible by the application 10.

The user client 20 may be a client device connected to the computing system 1. The user client 20 may include a user application 22 that may use the predictions and the results of outlier detection performed at the computing system 1. A specific example of the user client 20 may be a work-station remotely connected to a computational server, for instance using SSH (Secure Shell) or HTTP (Hypertext Transfer Protocol) requests. The DNN (deep neural network) can then be applied to user-provided input on the computational server and the resulting predictions and outlier metrics can be returned to the user client 20. The user client 20 may be part of the same physical device as the computing system 1 running the application 10, for instance on a work-station configured to perform DNN predictions.

The control system 30 may control a device using the predictions and the results of outlier detection performed at the computing system 1. A specific example of the control system 30 may be a control system of an autonomous vehicle, in which the control system may receive the prediction and the results of outlier detection to control the steering of the vehicle. The control system may comprise a programmatic client 32. In the specific example of the autonomous vehicle control system, the programmatic client is the software running in the control system receiving input and making decisions to how to control the vehicle.

Another specific example of the present techniques relates to characterization of input material to the control system of a biopharmaceutical manufacturing process. To ensure desired output quality of such manufacturing processes, control parameters of the process are adjusted according to properties of the input material. A heterogeneous combination of data sources may be used to characterize the input material including both structured and unstructured data. Example data sources may include text, such as event reports, images, chromatograms, spectroscopic data, chemical analysis, etc. Deep learning is well suited to analyze such heterogeneous combination of data due to deep learning's ability to find useful mappings from both structured and unstructured data to a given output. To avoid poor output quality or catastrophic failure when input data does not match the data used to train the deep learning model, it may be important to detect outliers after model training. If input data are identified as an outlier, the input data may not be used as input to the manufacturing process since the output quality cannot be guaranteed.

Another specific example of the present techniques is in control systems learned from data using deep reinforcement learning, rather than programmed by a human controller. In a biopharmaceutical manufacturing process there may be a large number of possible control parameters and it may be challenging to find all interactions and feedback loops existing in the system due to high complexity. Instead deep reinforcement learning may be used to learn control policies from data and simulation. To detect when the process enters a state that is different from states encountered during model training, outlier detection may be important. If such state is identified as an outlier, the deep learning based control system may warn the user (e.g., by sending a notification to the user) and/or may perform safety routines to avoid poor output quality or catastrophic failure. Examples of the use of deep reinforcement learning may be found in the art (e.g., Li, Y., Wen, Y., Guan, K., & Tao, D. (2017). Transforming Cooling Optimization for Green Data Center via Deep Reinforcement Learning. *arXiv preprint arXiv:*1709.05077; and Nguyen, P. & Takashi, E. (2018). Automating Water Purification Plant Operations Using Deep Deterministic Policy Gradient. In *Proceedings of Workshop* (Published at ICML Workshop for Deep Learning for Safety-Critical in Engineering Systems)).

Unlike prior art methods for outlier detection in deep learning models, the present methods do not constrain how the model is designed and/or trained, allowing these methods to be added to models in production. Additionally, as the present techniques are used after model training, the present techniques may be used with real-time applications and/or models implemented in a live application. In contrast, prior art methods that use multiple forward-passes/inferences per prediction (e.g., wherein the prediction is used as the average and the standard deviation or entropy is used as the uncertainty measure), may lead to increases in latency, which is problematic for real-time applications.

The third party system 40 may be implemented by a computer and may include a third party application 42. The third party system 40 may belong to an entity that is different from an entity to which the computing system 1 belongs to. The third party application 42 may use the predictions and the results of outlier detection performed at the computing system 1. A specific example of the third party application 42 may be a software relying on DNN predictions and results of outlier detection purchased from a DNN prediction provider.

The computing system 1 may be connected with the user client 20, the control system 30 and the third party system 40 via a network such as the Internet. In some examples, one or more of the user client 20, the control system 30 and the third party system 40 may be connected to the computing system 1 via an intranet.

Prediction-Time Outlier Detection Using Partial Least Squares Regression

As mentioned above, the outlier detection module 104 in the computing system 1 shown in FIG. 1 may be configured to construct a latent variable model using intermediate output values that are output from at least one of the plurality of hidden layers of the deep neural network 100 (e.g., the max pool layer MP1 or MP2 of FIG. 2), in order to determine whether or not an input image is an outlier with respect to the training dataset used for training the deep neural network 100.

The following provides an exemplary technique for outlier detection using partial least squares regression, which may facilitate understanding of how the outlier detection module 104 can detect outliers.

The concept of model uncertainty is related to that of prediction time outlier detection. In both cases, the main objective may be to find observations that do not correspond to observations with which the model has been trained. Predictive models have long been used to detect out-of-distribution observations during prediction in manufacturing process monitoring. In this field, linear latent variable models such as partial least squares (PLS) regression are widely used (see e.g., P. Geladi and B. R. Kowalski, "Partial least-squares regression: a tutorial," Anal. Chim. Acta, vol. 185, no. Supplement C, pp. 1-17, January 1986). A PLS model can find a sub-space approximating the training data similar to Principal Component Analysis (PCA) (S. Wold, K. Esbensen, and P. Geladi, "Principal component analysis," Chemom. Intell. Lab. Syst., vol. 2, no. 1, pp. 37-52, August 1987), which is used for predictions. New observations may then be projected onto the sub-space found by the PLS model. Accordingly, both distance within the sub-space and distance from the sub-space can be used to find outliers during prediction-time.

Prediction time refers to the time after the model has been fitted and the model is used for prediction in an application (and does not include time for model fitting/training, when the model is generated).

It is noted that, although simple and effective, the principles for the PLS model as mentioned above may not be directly applied to a deep learning system. Specifically, the basis for prediction of PLS is a sub-space of the input data space, making it straight-forward to compare the sub-space approximation of new observations to those used for training. Deep learning models, on the other hand, typically depend on multiple layers of non-linear transformations, where each transformation contributes to the final output. This may mean that seemingly different observations are transformed through a sequence of spaces and mapped to an output. This ability to find useful transformation of input to output may be the reason why deep learning models work well for unstructured data. However, a consequence of these transformations may be that the transformations make it difficult to determine whether or not new observations belong to the same data distribution that the model was trained on. There may be no obvious point of comparison to determine the limits of the deep learning model's knowledge and no obvious way to decide if a new observation is within those limits.

PLS regression is a widely used regression model within, for example, manufacturing process monitoring. Given an training data matrix with n rows of observations and p columns of features, denoted $X=[x_1 \ldots x_n]^T$, with corresponding target matrix with q columns of responses, denoted Y, a PLS model may summarize both data-matrices. Similar to PCA, PLS may find full-rank sub-spaces, of equal dimension k, called "latent variable spaces" that approximate X and Y. In contrast to PCA, the PLS may maximize the covariance between the sub-spaces found, instead of maximizing the variance of a single sub-space. In short, PLS may approximates the input data as:

$$X = TP^T + E \qquad (1)$$

Where $T=[t_1, \ldots, t_k]$ may be an n×k latent variable matrix spanning a full-rank sub-space of the column-space of X and maximizing the covariance with Y, P may be p×k matrix of PLS loadings, and E may be an n×p matrix of approximation residuals. The loadings may contain the linear combination weights used to approximate X from T. The response matrix for Y may be approximated in a similar way. More details on how to calculate the PLS model and use it for regression can be found in S. Wold, M. Sjöström, and L. Eriksson, "PLS-regression: a basic tool of chemometrics," Chemom. Intell. Lab. Syst., vol. 58, no. 2, pp. 109-130, October 2001.

The approximation of the input data provided by PLS can be used to detect outliers encountered during prediction. After model fitting, new observations may be projected onto the sub-space found using PLS by:

$$T_{new} = X_{new} P \qquad (2),$$

which may allow approximation of the new observations as:

$$X_{new} \approx \hat{X} = T_{new} P^T \qquad (3).$$

Both the sub-space projection, $T_{new}$, and the approximation may be used to detect outliers. Two exemplary measures used to detect outliers during prediction-time are Mahalanobis distance in the latent variable space and approximation residuals in the input column space.

One way to detect outliers during prediction-time when using PLS may be to use Mahalanobis distance. The Mahalanobis distance is a known statistical distance measuring how many standard deviations away an observation is from the origin in a multivariate probability distribution. The intuition may be that observations with large Mahalanobis distances are unlikely under the given probability distribution. A latent variable probability distribution may be parametrized using a covariance matrix, $C_T$, of the latent variables in T, assuming that the latent variables have zero mean. Then the Mahalanobis distance $d_i$ of an observation $x_i$ with projection $t_i$ in latent variable space may be calculated as:

$$d_i = \sqrt{t_i^T C_T^{-1} t_i} \qquad (4)$$

While the Mahalanobis distance can measure how unlikely an observation is under the given distribution, the Mahalanobis distance may provide no information whether or not the observation belongs to that distribution. In contrast, the approximation residuals can provide a simple measure of how far from the distribution a new observation is. Given a fitted PLS model, an observation $x_i$ may be approximated as $\hat{x}_i$. The squared approximation residual may then be simply given by:

$$RSS = \sum_{j=1}^P (x_{i,j} - \hat{x}_{i,j})^2 \qquad (5)$$

where $x_{i,j}$ may be the j-th element of the observation vector. The intuition may be that the approximation of observations from another distribution than the training distribution will fail resulting in large approximation residuals.

Prediction-Time Outlier Detection for Deep Neural Networks

The outlier detection module 104 may perform an add-on method based on the principles for prediction time outliers in, e.g., manufacturing process monitoring, as stated above, for finding observations that the deep neural network 100 may not be able to explain.

The method performed by the outlier detection module 104 to detect prediction-time outliers in a deep learning system may be based on the fact that a neural network may function by transforming input data. When input data is fed through a deep neural network, multiple intermediate representations of the data may exist, where the intermediate representations may be used for prediction (e.g., of a group into which the input data is classified in case the deep neural network is configured to solve a classification problem). One or more of these intermediate representations may be used for detecting outliers during prediction, as well as for performing the prediction.

In order to provide a possibility to detect outliers during prediction in a similar way as PLS, a feed-forward neural network may be considered as a series of non-linear transformations. In other words, an activation vector $a_i$ of an observation x (input data) from layer i (=1, 2, 3, 4, . . . ) of the given network may be given by the nested series of transformations as follows:

$$a_i f_i(W_i f_{i-1}(W_{i-1} f_{i-2}(\ldots f_1(W_1 x)))) \qquad (6)$$

where $f_k$ (k=1, 2, . . . , i) may be activation functions and $W_k$ (k=1, 2, . . . , i) may be weight matrices. The activation vector $a_i$ of the observation x may be considered as an intermediate output from the layer i of the given network and may include element values corresponding to outputs from respective nodes of the layer i when the observation x is input to the given network. Each of these activations $a_k$ may provide a feature representation of the input data. Although the weight matrices may be commonly obtained by supervised training using back-propagation, the activations may simply provide transformed, or pre-processed, representations of the input data.

To explain the transformation in more detail, observation x may be an n-dimensional row vector $x=[x_1\ x_2\ \ldots\ x_n]$ wherein n depends on the application. In the case of x which is a single channel image, n may be the image's length in pixels multiplied with the image's width in pixels and the values $x_1, x_2, \ldots, x_n$ are the pixel values of the image. In the first layer, x is matrix multiplied with the first weight matrix $W_1$ to form the linear projection $\hat{x}$ which is $n_1$-dimensional. The dimension of $W_1$ is $n \times n_1$. After linear projection, an activation function $f_1$ is applied to z to form activation $a_1$. The activation function $f_1$ may be a non-linear function. Common choices of activation functions include the rectified linear function $f(x)=\max(0,x)$, the sigmoid function $f(x)=(1+e^{-x})^{-1}$, the softmax function $f(x)=e^{x_j}/\sum_{m=1}^n e^{x_m}$, among others. Then, the activation $a_1$ is matrix multiplied with the weight matrix $W_2$ and the resulting linear projection $\hat{a}_1$ is transformed using an activation function. The procedure of matrix multiplication with weight matrices and transformation using activation functions is repeated i times until activation $a_i$ of layer i is obtained.

Using these intermediate representations, a plug-and-play method for detecting outliers in any feed-forward neural network may be provided. Given a trained network, the training data can be represented using the activation matrix $A_i=[a_{1,i} \ldots q_{n,i}]^T$ from layer i, where n may be the number of observations. Since $A_i$ may not be full-rank, it may be desirable to find a full-rank sub-space that can be used to approximate $A_i$. In some examples, PCA may be used to obtain the sub-space using linear projections, for mapping the data to a low-dimensional sub-space. In some other examples, other methods such as autoencoders, random projections, sparse principal components analysis, and/or self-organizing maps may be used for mapping the data to a low-dimensional sub-space.

In the examples of using PCA, the dimensionality of the training data activations can be reduced to m dimensions to obtain:

$$T_A, P_A = PCA(A_i) \qquad (7)$$

Similar to PLS, $T_A$ may denote the latent-variable matrix spanning a sub-space of the training set activations and $P_A$ may denote the PCA loadings. For example, PCA in matrix form may provide the following least squares model:

$$A_i = T_A P_A^T + E \qquad (8)$$

which may be considered analogous to equation (1) as stated above.

In the same manner as PLS, the covariance matrix of the latent variables and loading matrices may be used to detect prediction-time outliers based on Mahalanobis distance and approximation residual.

When new observations are predicted using the trained neural network, the activations $A_{i,new}$ may also be extracted. The new activations may be projected to the sub-space found from the training data activations in the same way as when using PLS:

$$T_{A,new} = A_{i,new} P_A \quad (9)$$

And the Mahalobis distances of the new observations may be calculated according to the equation (4).

The new activations may also be approximated using the PCA loadings as:

$$A_{i,new} \approx \hat{A}_{i,new} = T_{A,new} P_A^T \quad (10)$$

The approximation residual calculated according to the following equation (11) (analogous to equation (5)) may also be used to detect outliers in the same way as when using PLS:

$$RSS = \Sigma_{j=1}^p (a_{i,j} - \hat{a}_{i,j})^2 \quad (11)$$

where p may indicate the number of nodes in layer i. These equations, namely equations (7) to (11), have been adapted in a novel manner as provided herein to apply activations from deep neural networks.

Process for System Setup

Figure 3:
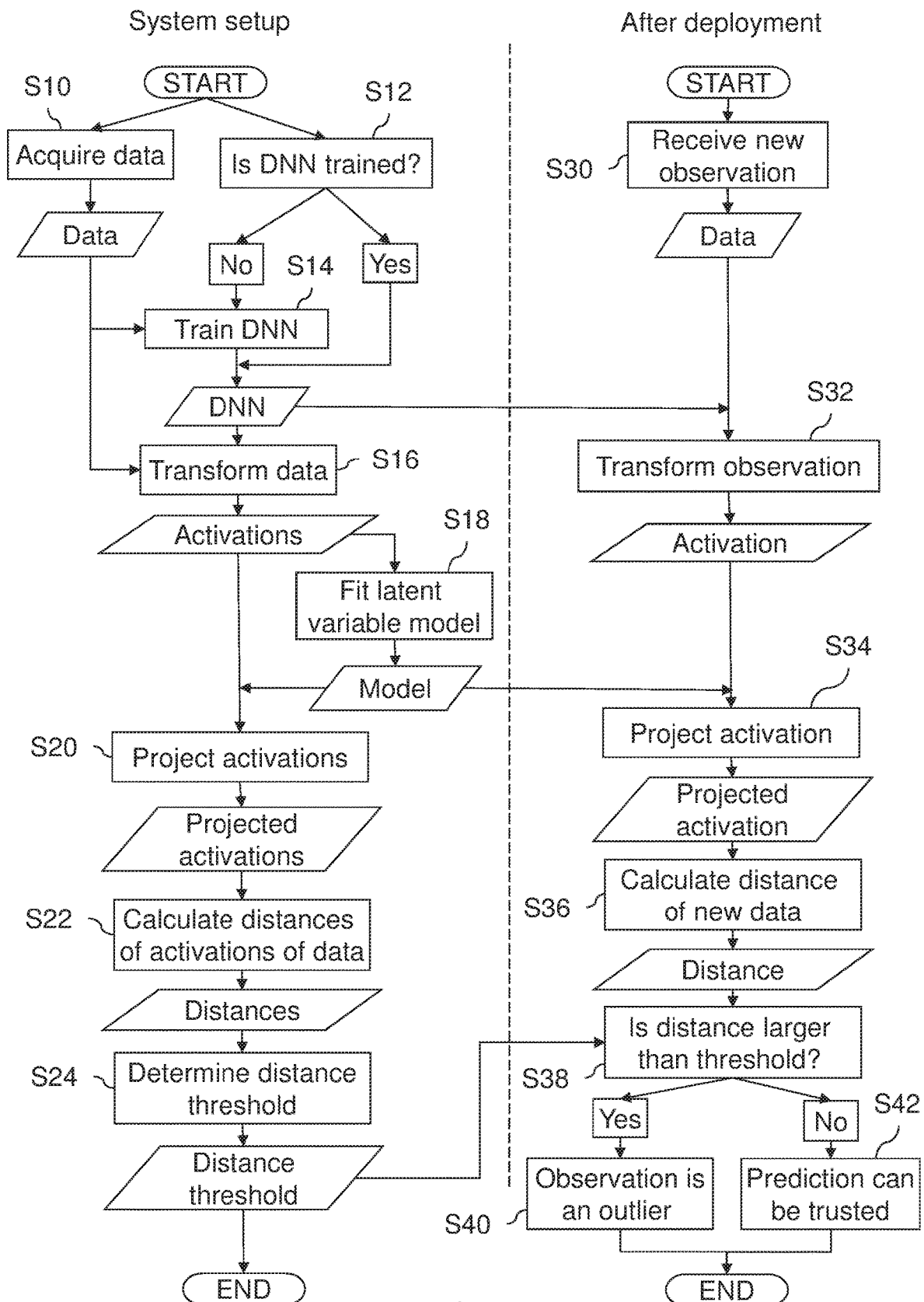
FIG. 3 shows a flowchart of exemplary processes performed by the system according to the present disclosure.

The left hand part of FIG. 3 shows a flowchart of an exemplary process for setting up the computing system 1. The exemplary process shown in FIG. 3 may be performed by the application 10 of the computing system 1.

At step S10, the application 10 may acquire data from the data storage device 12. The data may be at least a part of a training dataset for training the deep neural network 100. The training dataset may include possible observations input to the deep neural network 100. In case the deep neural network 100 is a CNN as shown in FIG. 2, for example, the training dataset may include possible input images to the CNN as the possible observations.

At step S12, the application 10 may determine whether or not the deep neural network 100 has already been trained. Step S12 may be performed before, after, or in parallel with step S10.

If it is determined that the deep neural network 100 has not yet been trained (No at step S12), the process may proceed to step S14. If it is determined that the deep neural network 100 has already been trained (Yes at step S12), the process may proceed to step S16.

At step S14, the application 10 may train the deep neural network 100 using the data acquired at step S10.

At step S16, the application 10 may transform data using the deep neural network 100. Specifically, for example, the application 10 may obtain the activation vectors from at least one layer of the deep neural network 100 according to equation (6) stated above, of the possible input images in the training dataset. An activation refers to the result of a sequence of matrix multiplications and transformation using an activation function by an observation as described by equation (6).

At step S18, the application 10 may fit a latent variable model. In other words, the application 10 may construct the latent variable model. For example, the application 10 may obtain the latent-variable matrix $T_A$ and the PCA loadings $P_A$ using PCA as stated above (see e.g., equations (7) and (8)). Alternatively, the application may train an autoencoder using the activation vectors as inputs.

At step S20, the application 10 may project activations using the latent variable model. For example, the application 10 may obtain, from the activation vectors obtained at step S16, corresponding sets of projected values (e.g., T) in the sub-space found by constructing the latent variable model.

At step S22, the application 10 may calculate distances of activations of data. For example, the application 10 may calculate the Mahalonobis distance for each of the activation vectors obtained at step S16, with respect to the latent variable model constructed at step S18, according to equation (4) stated above. Additionally or alternatively, for example, the application 10 may calculate the squared approximation residual for each of the activation vectors obtained at step S16 according to equation (11) stated above.

At step S24, the application 10 may determine a threshold value for the distance. Additionally or alternatively, a threshold value for the squared approximation residual may be determined. The threshold value(s) may later be used for determining whether a new observation (e.g., input image) is an outlier with respect to the training dataset. For obtaining the threshold value(s), the distances and/or the squared approximation residuals calculated at step S22 may be used. For instance, the threshold value may be a percentile, e.g., the $95^{th}$ percentile, of the distances (or the squared approximation residuals) calculated at step S22. It is noted that the "$95^{th}$ percentile" is merely an example and a value greater or lower than 95 may also be used as the percentile to determine the threshold.

The process for system setup may end after step S24.

Process for Outlier Detection

The right hand side of FIG. 3 shows an exemplary process performed by the computing system 1 for detecting outliers.

At step S30, the application 10 may receive a new observation. For example, in case the deep neural network 100 is a CNN as shown in FIG. 2, an image to be input to the CNN may be received as the new observation.

At step S32, the application 10 may transform the new observation. For example, the application 10 may obtain the activation vector from at least one layer of the deep neural network 100 according to equation (6) stated above, of the new observation.

At step S34, the application 10 may project activation using the latent variable model constructed at step S18 as stated above. For example, the application 10 may obtain, from the activation vector obtained at step S32, a corresponding set of projected values (e.g., $T_{A,new}$) in the sub-space found by constructing the latent variable model (see equation (9)).

At step S36, the application 10 may calculate a distance of the new observation. For example, the application 10 may calculate the Mahalanobis distance for the activation vector of the new observation obtained at step S32, with respect to the latent variable model constructed at step S18, according to equation (4) stated above. Additionally or alternatively, for example, the application 10 may calculate the squared approximation residual for the activation vector of the new observation obtained at step S32 according to equation (11) stated above.

At step S38, the application 10 may determine whether or not the distance calculated at step S36 is larger than the threshold determined at step S24.

If yes at step S38, the process may proceed to step S40 and the application 10 may determine that the new observation is an outlier. In this case, the system may report the model prediction as an unreliable prediction, since the new observation is determined to be an outlier. The process may end after step S40.

If no at step S38, the process may proceed to step S42 and the application 10 may determine that the prediction made by the deep neural network 100 for the new observation can be trusted. In this case, the system may report the model prediction as a reliable prediction, since the new observation is determined to be a non-outlier. The process may end after step S42.

Experiments

In this section, results of experiments for outlier detection performed by the exemplary computing system 1 will be described. In the following experiments, the deep neural network 100 are directed to solve image classification tasks.

Fashion-MNIST

The first experiment involves the Fashion-MNIST classification dataset (H. Xiao, K. Rasul, and R. Vollgraf, "Fashion-MNIST: a Novel Image Dataset for Benchmarking Machine Learning Algorithms," ArXiv170807747 Cs Stat, August 2017, Available: https://arxiv.org/abs/1708.07747 [Accessed: 21 Jun. 2018]), consisting of 70 000 greyscale 28×28 pixel images of ten categories of fashion products. The training data set has 60 000 images and the test set 10 000 images. The Fashion-MNIST dataset is used as a drop-in replacement for the original MNIST dataset (Y. LeCun, C. Cortes, and C. Burges, "MNIST handwritten digit database, Yann LeCun, Corinna Cortes and Chris Burges." [Online]. Available: http://yann.lecun.com/exdb/mnist/. [Accessed: 21 Jun. 2018]).

In this experiment, images from five out of the ten Fashion-MNIST categories were excluded from model fitting in order to use them as outliers later on. All shoe categories (e.g., sandals, ankle boots and sneakers) were excluded to eliminate all information on how shoes look. Two classes of clothes were also excluded (pullover and shirts) in order to provide more difficult-to-detect outliers since the training data contain other upper body garments (T-shirts, dresses and coats). A CNN as shown in FIG. 2 was trained using rmsprop (see e.g., T. Tieleman and G. Hinton, "Lecture 6.5-rmsprop: Divide the gradient by a running average of its recent magnitude," COURSERA Neural Netw. Mach. Learn., vol. 4, no. 2, pp. 26-31, 2012) optimization, categorical cross entropy loss function, batch size 128 for 10 epochs keeping 10% of the images as validation set and achieved a test set accuracy of 97.06%.

Figure 6:
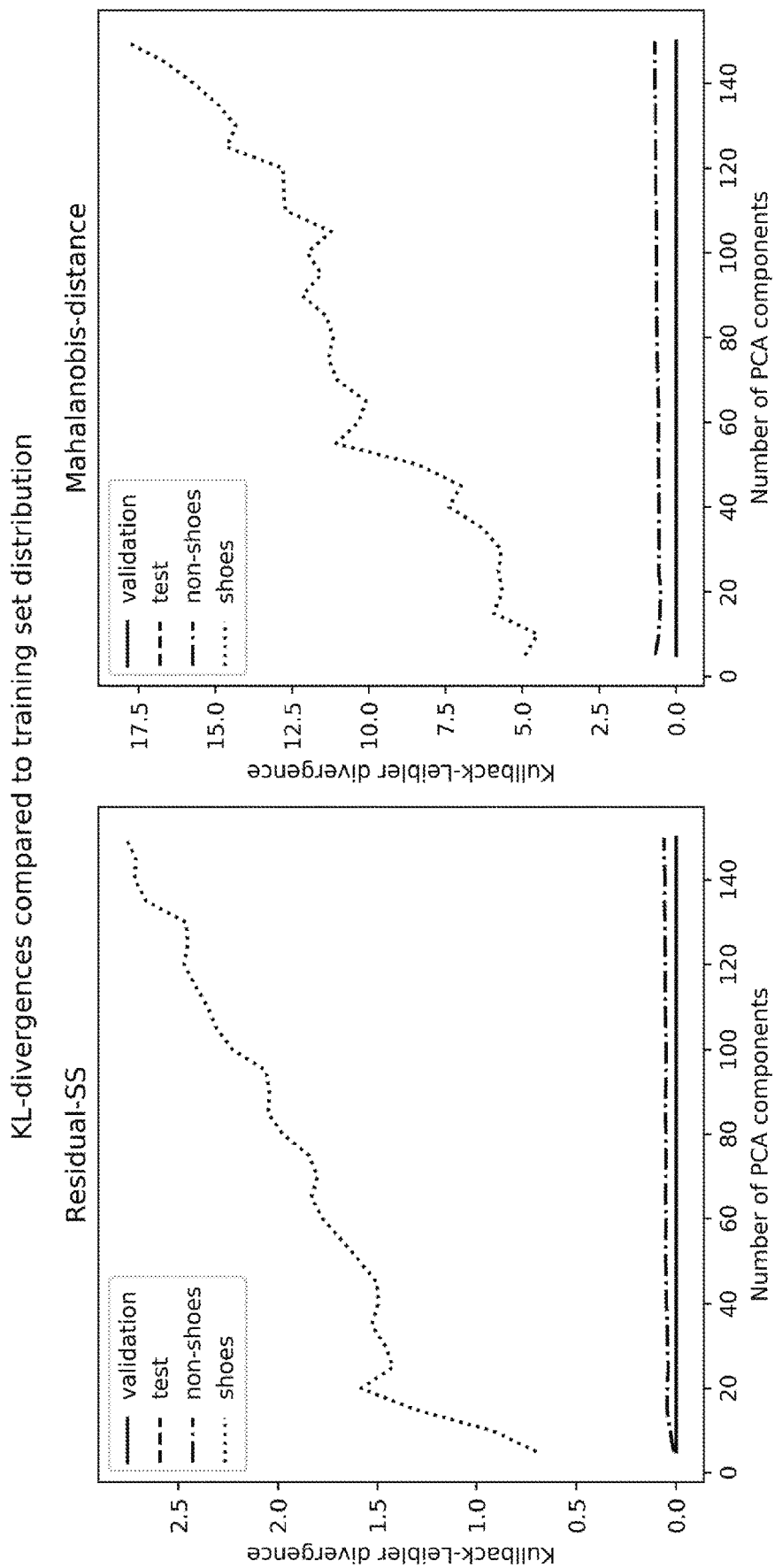
FIG. 6 shows Kullback-Leibler divergence between validation set, test set and outlier sets distribution compared to the training set distribution in the Fashion-MNIST experiment.

To compare which layer to use for the outlier detection, image activations were extracted from both the first and second max-pooling layers MP1, MP2 (see FIG. 2) and training set activations were used to fit PCA models with 150 components. A robust estimate of the covariance of the latent variable matrix was adopted using the minimum covariance determinant method (see e.g., P. J. Rousseeuw, "Least Median of Squares Regression," J. Am. Stat. Assoc., vol. 79, no. 388, pp. 871-880, December 1984; P. J. Rousseeuw, "Multivariate estimation with high breakdown point," Math. Stat. Appl., vol. 8, pp. 283-297, 1985). How many components to use separately was evaluated, as shown in FIG. 6. FIG. 6 shows Kullback-Leibler divergence between validation set, test set and outlier sets Mahalanobis distance (left) and residual sum-of-squares (Residual SS) (right) distribution compared to the training set distribution in the Fashion-MNIST example for different number of PCA components used. The Kullback-Leibler divergence is a measure of how dissimilar two probability distributions are. It is found to be favorable to use as many principal components as possible while being able to calculate the robust covariance estimate. Image features from all datasets were projected onto the PCA models. It is noted that, in FIG. 6, the solid line for the validation set and the broken line for the test set are plotted very close to each other, which makes it difficult to distinguish these two lines in the graphs.

Figure 4A:
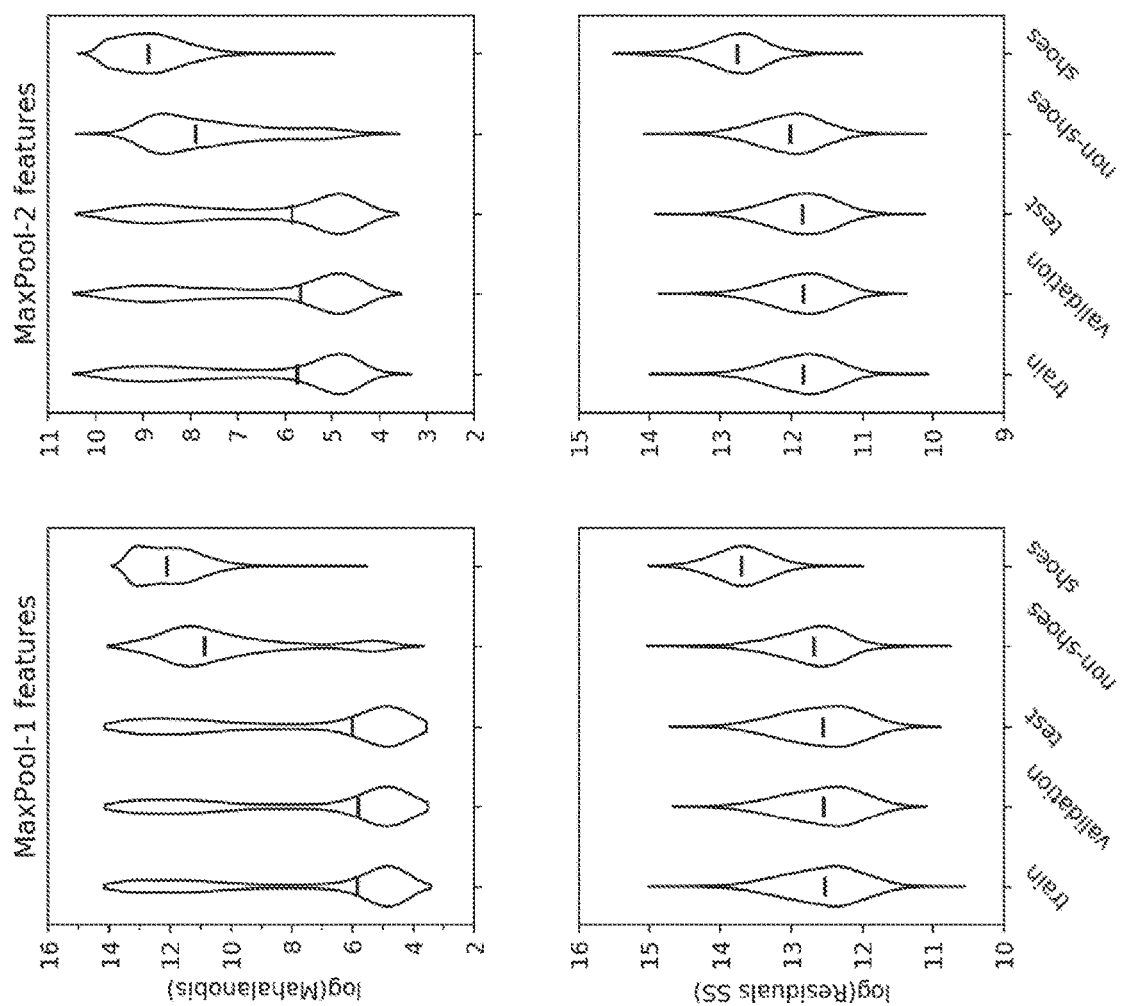
FIGS. 4A and 4B show distances calculated in an exemplary experiment using Fashion-MNIST.
Figure 4B:
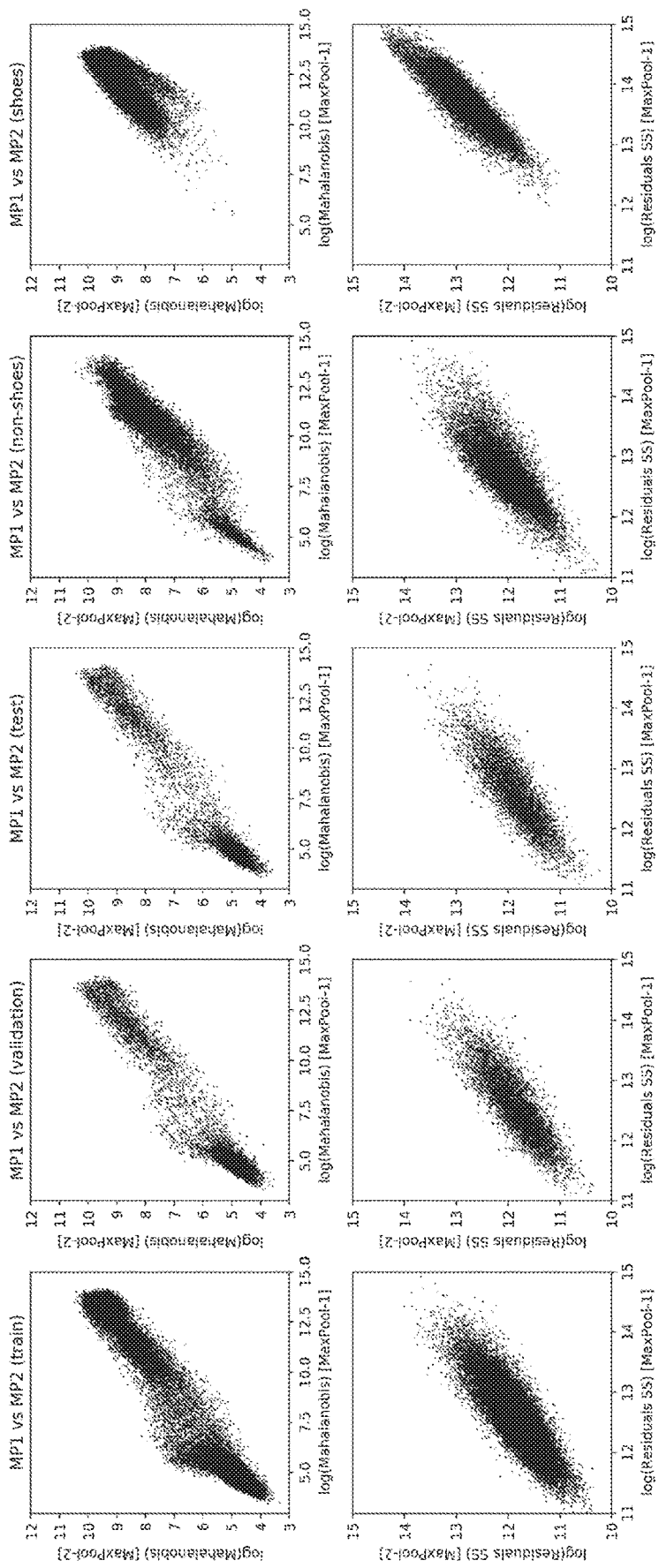
Figure 5:
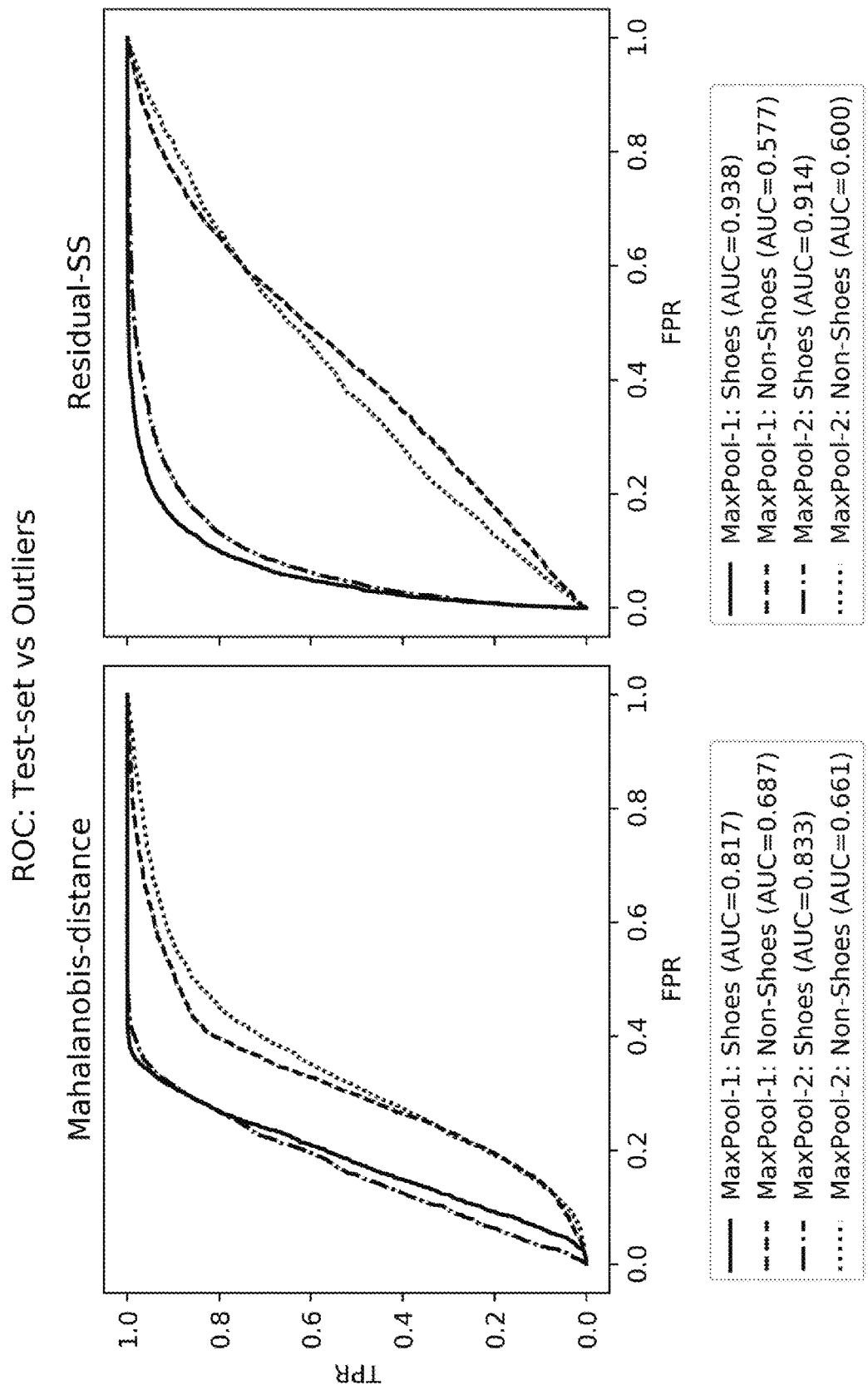
FIG. 5 shows ROC-curves from evaluation of outlier detection performance in the Fashion-MNIST experiment.

To evaluate how well the exemplary computing system 1 works for outlier detection during prediction, the observation-wise log-transformed residual sum-of-squares and Mahalanobis-distance for all data were calculated, as shown in FIGS. 4A and 4B. FIGS. 4A and 4B show summary of distances calculated for Fashion-MNIST experiment, log-transformed Mahalanobis distances in top row and log-transformed residual sum of squares in bottom row. Specifically, FIG. 4A shows, from left to right; violin-plots of distances calculated from first (left column) and second (right column) max-pool layer outputs, and FIG. 4B shows scatter plots of distance from both max-pool layer outputs against each other. The Mahalanobis distance and residual sum-of-squares of two types of outliers were compared with the test-set to see how well this method distinguishes outliers and non-outliers. The Receiver-Operating-Characteristic Area-Under-Curve (ROC-AUC) metric is used to measure performance, as shown in FIG. 5. The model can be considered more accurate as the value of the ROC-AUC metric is larger. FIG. 5 shows ROC-curves from evaluation of outlier detection performance in the Fashion-MNIST example. The curves are calculated by comparing how well the distances separate the outlier-classes from the test set.

Referring to FIG. 5, the strong outliers (shoe categories) are indefinitely separated from non-outliers, and the weak outliers (upper body garments) are successfully separated as well. The strong outliers are separated from non-outlier images using both residuals (ROC-AUC of 0.938 and 0.914 for max pool layers MP1 and MP2 features respectively) and Mahalanobis-distances (ROC-AUC of 0.817 and 0.833 respectively). As expected, the weak outliers are harder to distinguish as outliers since they share more visual features with the images used for model training. Nevertheless, using Mahalanobis-distance as outlier detection measure does separate them successfully, but not as strongly as the shoe-outliers (ROC-AUC 0.687 and 0.661 for MaxPool-1 and -2 features respectively). Residuals only weakly detect the non-shoe outliers in this case (ROC-AUC 0.577 and 0.600).

Figure 7:
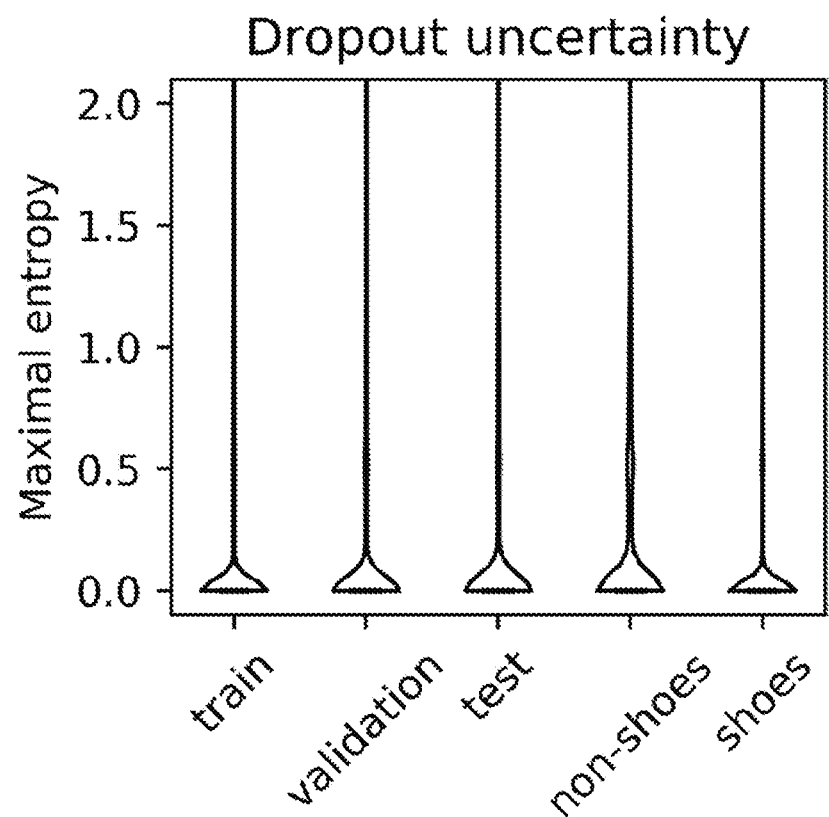
FIG. 7 shows violin plots of maximal predictive entropy when using MC-dropout for different datasets of the Fashion-MNIST experiment.

As a comparative example, MC-dropout was used to calculate the maximal image-wise Shannon entropy from 50 Monte Carlo samples for the same images (see e.g., FIG. 7 showing violin plots of maximal predictive entropy when using MC-dropout for the different datasets of the Fashion-MNIST). Surprisingly, the dropout-based approach failed to detect the shoe outlier (ROC-AUC 0.495) and detected non-shoe outliers to a weaker extent than using PCA-based Mahalanobis-distances (ROC-AUC 0.631 for dropout-based uncertainty).

b) ImageNet

In the second experiment, a different CNN architecture, as compared to previous examples, is used. The CNN architecture in the second experiment has more layers, complex connectivity, and multiple sizes of convolution kernels as compared to previous examples. In the second experiment, a pre-trained CNN was used on image synsets from the ImageNet-database (see e.g., J. Deng, W. Dong, R. Socher, L. J. Li, K. Li, and L. Fei-Fei, "ImageNet: A large-scale hierarchical image database," in 2009 IEEE Conference on Computer Vision and Pattern Recognition, 2009, pp. 248-255.). The term "synset" is used in WordNet which is a lexical database for the English language. The WordNet groups English words into sets of synonyms called synsets, provides short definitions and usage examples, and records a number of relations among these synonym sets or their members. ImageNet uses the hierarchical structure of WordNet and each "synset" may correspond to a concept in WordNet, possibly described by multiple words or word phrases. In ImageNet, it is aimed to provide on average 500 to 1000 images to illustrate each synset. In order to evaluate the methodology applied in the exemplary computing system 1 in a more complex experiment, Inception v3-network (see e.g., C. Szegedy, V. Vanhoucke, S. Ioffe, J. Shlens, and Z. Wojna, "Rethinking the inception architecture for computer vision," in Proceedings of the IEEE Conference on Computer Vision and Pattern Recognition, 2016, pp. 2818-2826) already trained on the ImageNet was used to demonstrate how to detect outliers in a cat vs dog-classifier. Images from the ImageNet cat and dog synsets were used as non-outlier data, with 80% of the images as training data, 10% for validation data and 10% as test data. To provide outliers, images from the ImageNet horse-synset were used as weak outliers and images from the car-synset as strong outliers. The intuition is that horse images share more visual features, such as eyes, ears and fur, with cats and dogs than they do with cars.

To compare detection performance at different depths in Inception, activations were extracted from all inception module (e.g., hidden layer or intermediate layer) filter concatenations which were pooled using global average pooling (see e.g., M. Lin, Q. Chen, and S. Yan, "Network In Network," ArXiv13124400 Cs, December 2013). In the same manner as in the Fashion-MNIST example, a separate PCA model and latent variable covariance matrix were calculated for each blocked of pooled inception activations from cat- and dog-images. Again, the Mahalanobis-distances and residual sum-of-squares were used to detect outliers and performance was evaluated using ROC-AUC of the difference between test set and outliers.

Figure 8:
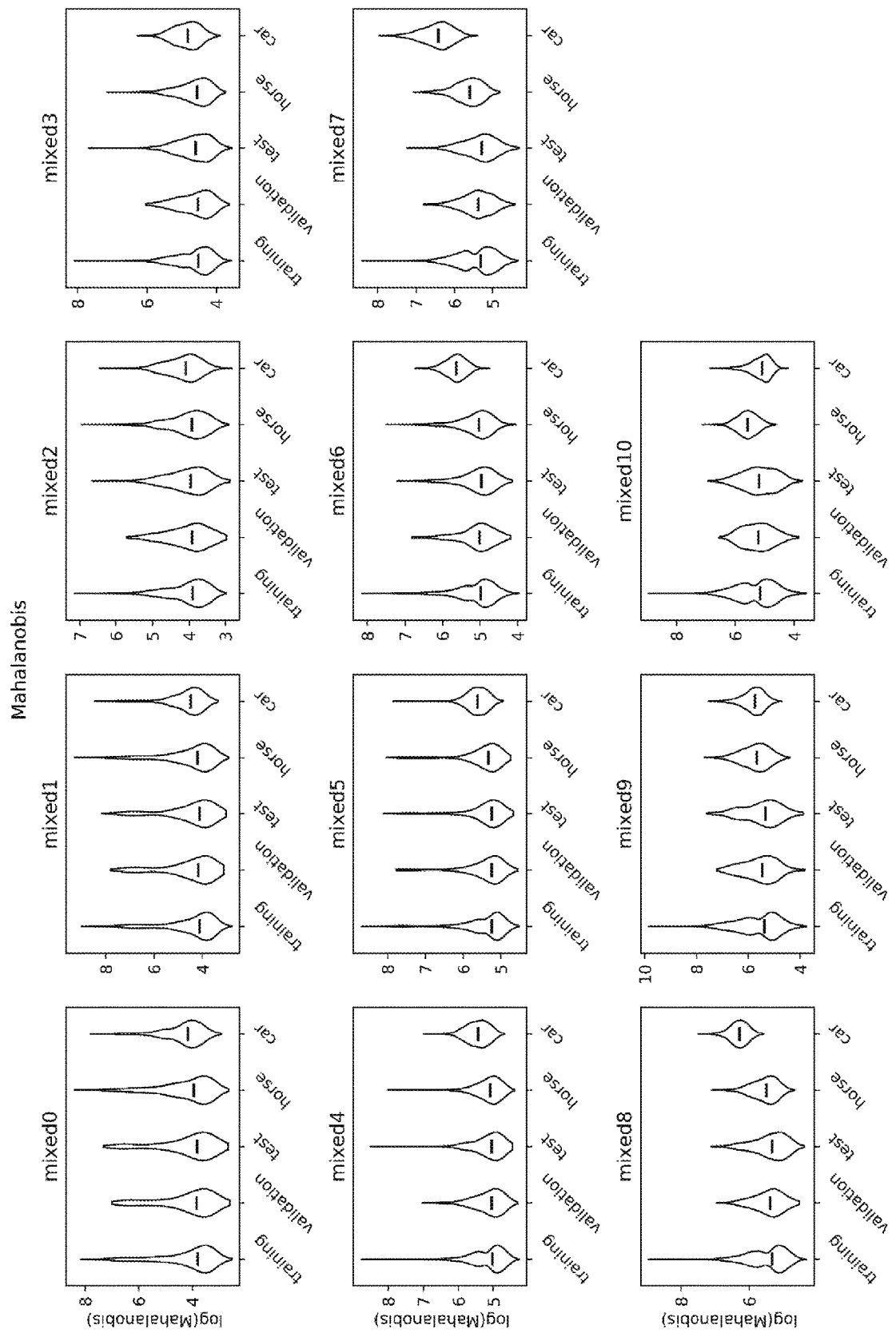
FIG. 8 shows violin plots of log-transformed Mahalanobis distances from all inception-modules (mixed 0-10) in an exemplary experiment using the ImageNet.
Figure 10:
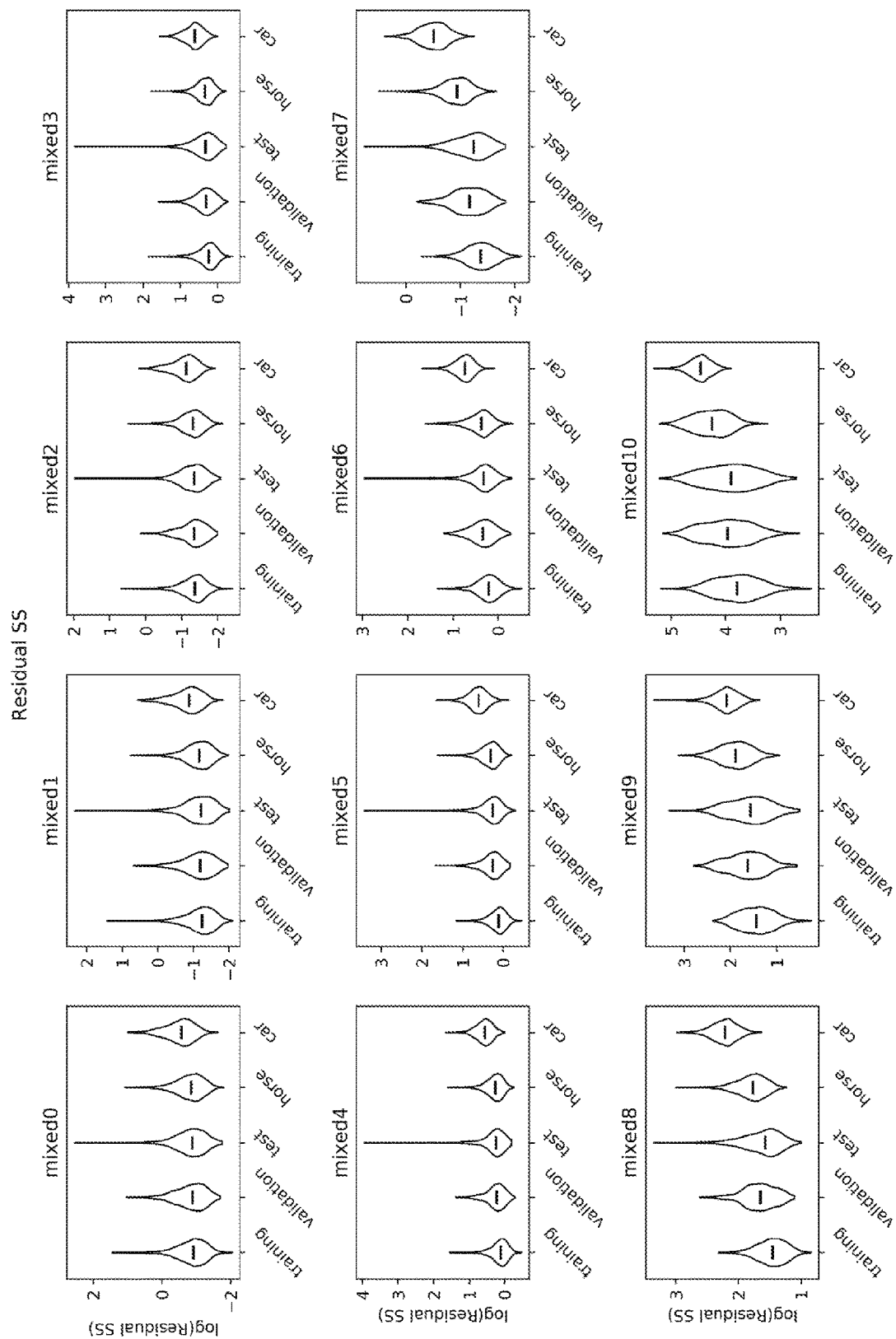
FIG. 10 shows violin-plots of log-transformed residual sum of squares from all inception-modules (mixed 0-10) in the ImageNet experiment.

FIG. 8 shows violin-plots of log-transformed Mahalanobis distances from all inception-modules (mixed0-10) in the ImageNet experiment. Further, FIG. 10 shows violin-plots of log-transformed residual sum of squares from all inception-modules (mixed0-10) in the ImageNet experiment.

Figure 9:
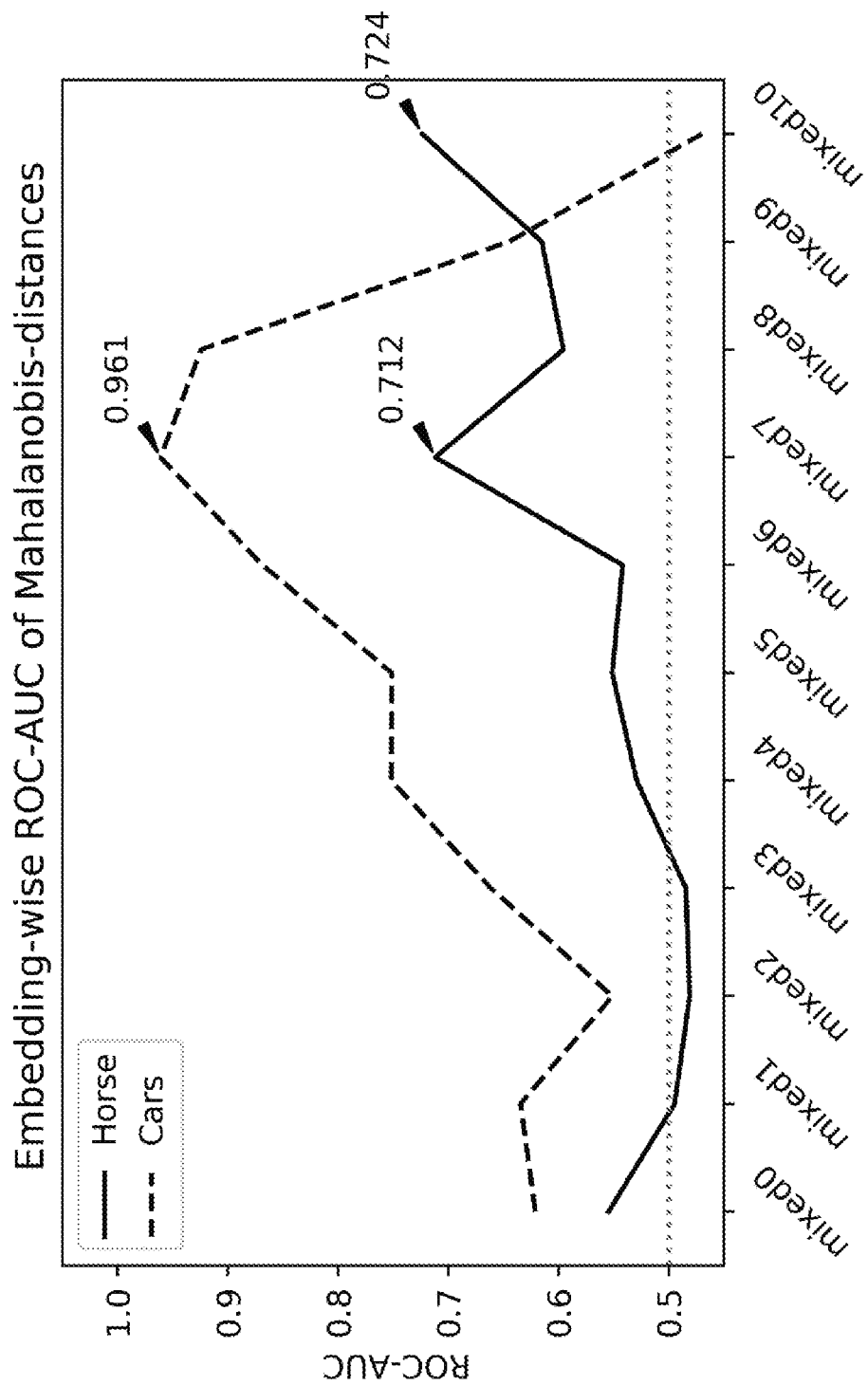
FIG. 9 shows ROC-AOC evaluation of outlier detection performance using Mahalanobis distance for each inception-module in the ImageNet experiment.
Figure 11:
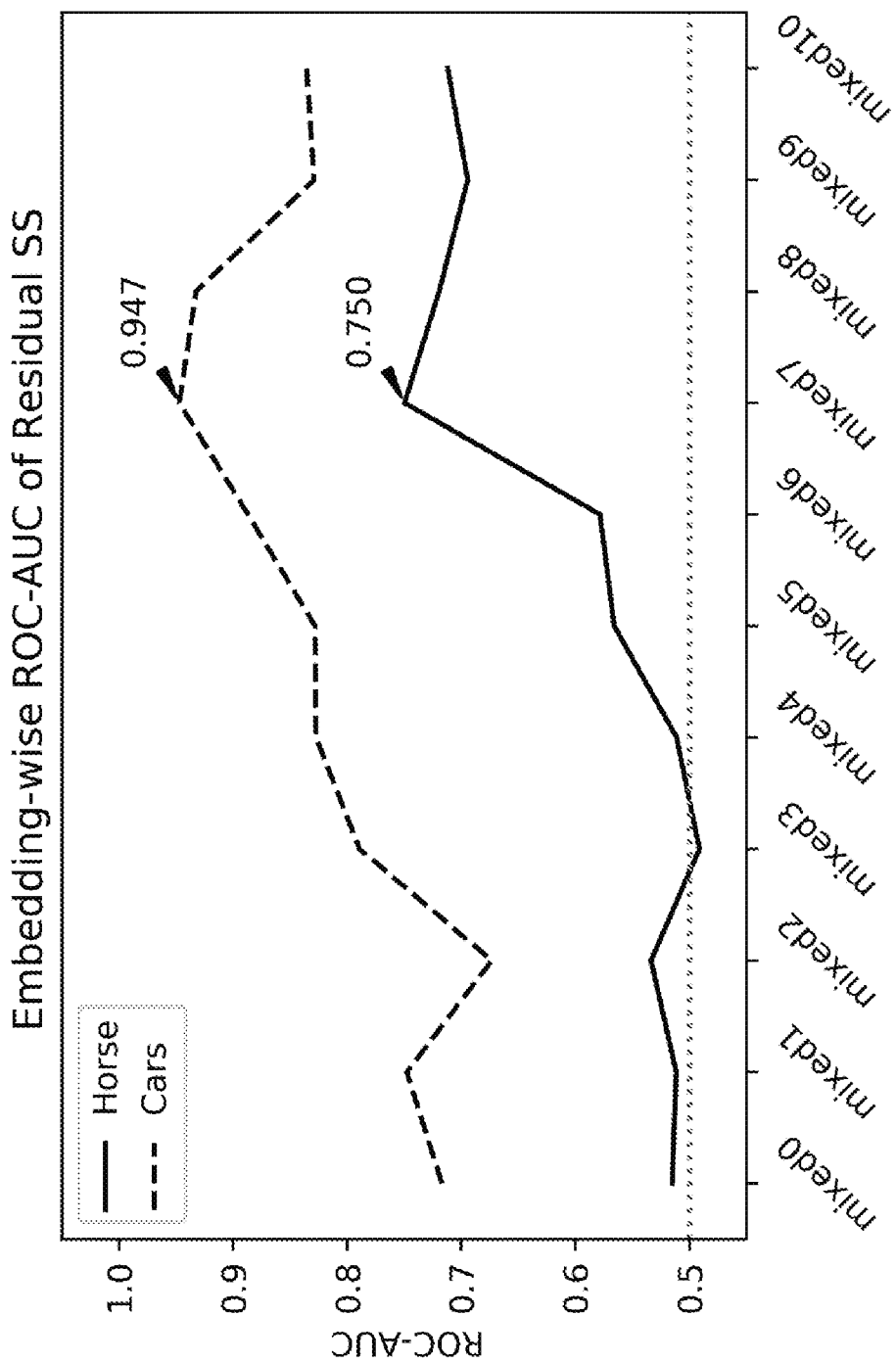
FIG. 11 shows ROC_AUC evaluation of outlier detection performance using residual sum of square for each inception-module in the ImageNet experiment.

Outliers are better detected deep into the Inception-network, as can be seen from FIGS. 9 and 11. FIG. 9 shows ROC-AUC evaluation of outlier detection performance using Mahalanobis distance for each inception-module (mixed0-10) for both weak outliers (Horse) and strong outliers (Cars). FIG. 11 shows ROC-AUC evaluation of outlier detection performance using residual sum of square for each inception-module (mixed0-10) for both weak outliers (Horse) and strong outliers (Cars). Referring to FIGS. 9 and 11, the ROC-AUC metric peaks at the eighth layer, the inception module mixed7. The car-images are detected successfully as outliers with ROC-AUC of 0.961 using Mahalanobis distances and 0.946 using residual sum of squares. The less obvious are also detected as outliers with ROC-AUC of 0.712 using Mahalanobis distance and 0.750 using residual sum-of-squares.

Again, MC-dropout is used in a comparative example. The top-layer of the Inception v3-network is replaced with a layer of 128 hidden units with ReLu (rectified linear unit)-activations and a single output is replaced with sigmoid activation with 50% dropout before and after the ReLu-layer. The initial Inception weights were frozen and only the top-layers were trained achieving a test set accuracy of 93%. All sets of images were Monte Carlo sampled 100 times using prediction time dropout and the Shannon entropy for each prediction was recorded. Using this methodology, both types of outliers were detected but less reliably compared to the method applied in the exemplary computing system 1 (ROC-AUC of 0.873 for car-images and 0.631 for horse-images).

The performance of outlier detection in the ImageNet experiment is summarized in the following Table 1.

TABLE 1

Summary of performance of outlier detection in the ImageNet experiment.

| | ROC-AUC (Horse) | ROC-AUC (Car) |
|---|---|---|
| Residual SS (mixed7) | 0.763 | 0.946 |
| Mahalanobis distance (mixed7) | 0.703 | 0.959 |
| KDE + Residual SS | 0.617 | 0.865 |
| KDE + Mahalanobis distance | 0.567 | 0.799 |
| MC-Dropout | 0.631 | 0.873 | c) Predictive Maintenance

In the above-stated two experiments, Fashion-MNIST and ImageNet, a CNN was used as the deep neural network 100 for image analysis. The exemplary computing system 1, however, can also perform outlier detection in analyzing types of data other than images. For example, outlier detection by the exemplary computing system 1 may be performed for a predictive maintenance task in which conditions of in-service equipment are determined in order to predict when maintenance should be performed. This section provides experimental results of outlier detection for predictive maintenance of turbofan engines.

In this experiment, the Turbofan Engine Degradation dataset provided by the Prognostics CoE at NASA Ames (Saxena, A. and Goebel, K. "Turbofan Engine Degradation Simulation Data Set", NASA Ames Prognostics Data Repository (http://ti.arc.nasa.gov/project/prognostic-data-repository), 2008, NASA Ames Research Center, Moffett Field, CA) was used. The dataset consists of simulated turbofan engines running to failure under different operational conditions and fault modes. The engines were monitored over time using 21 sensors. The sensors used included temperature sensors, pressure sensors, fan and core speed sensors, coolant bleed measurements and burner fuel-air ratio measurements. The details of the dataset can be found in, for example, Saxena, A., Goebel, K., Simon, D., & Eklund, N., "Damage propagation modeling for aircraft engine run-to-failure simulation", In *Prognostics and Health Management*, 2008, *PHM* 2008, *International Conference on* (pp. 1-9), IEEE, October 2008. Further, 3 control settings were recorded for 100 engines in the training dataset and 100 in the test dataset. The challenge is to predict failure 15 sensor cycles before the failure happens to avoid catastrophic failure.

To predict failure, a neural network model based on Long-Short Term Memory (LSTM)-block (Hochreiter, Sepp, and Jürgen Schmidhuber. "Long Short-Term Memory." Neural Computation 9, no. 8,1997, p. 1735-1780; Gers, Felix A., Jürgen Schmidhuber, and Fred Cummins. "Learning to Forget: Continual Prediction with LSTM." Neural Computation 12,1999, p. 2451-2471) was trained. An LSTM block may be understood as a unit in a recurrent neural network and may comprise a cell, an input gate, an output gate and a forget gate. The cell may "remember" values over arbitrary time intervals, e.g., implementing an internal "memory". Each of the input, output and forget gates may be considered as a node in a neural network, which computes an activation of a weighted sum using an activation function. The input, output and forget gates may be connected to the cell and may be considered as regulators of the flow of values that goes through the connections of the LSTM block. The LSTM model was used as the deep neural network 100 of the computing system 1 in this experiment.

Figure 12:
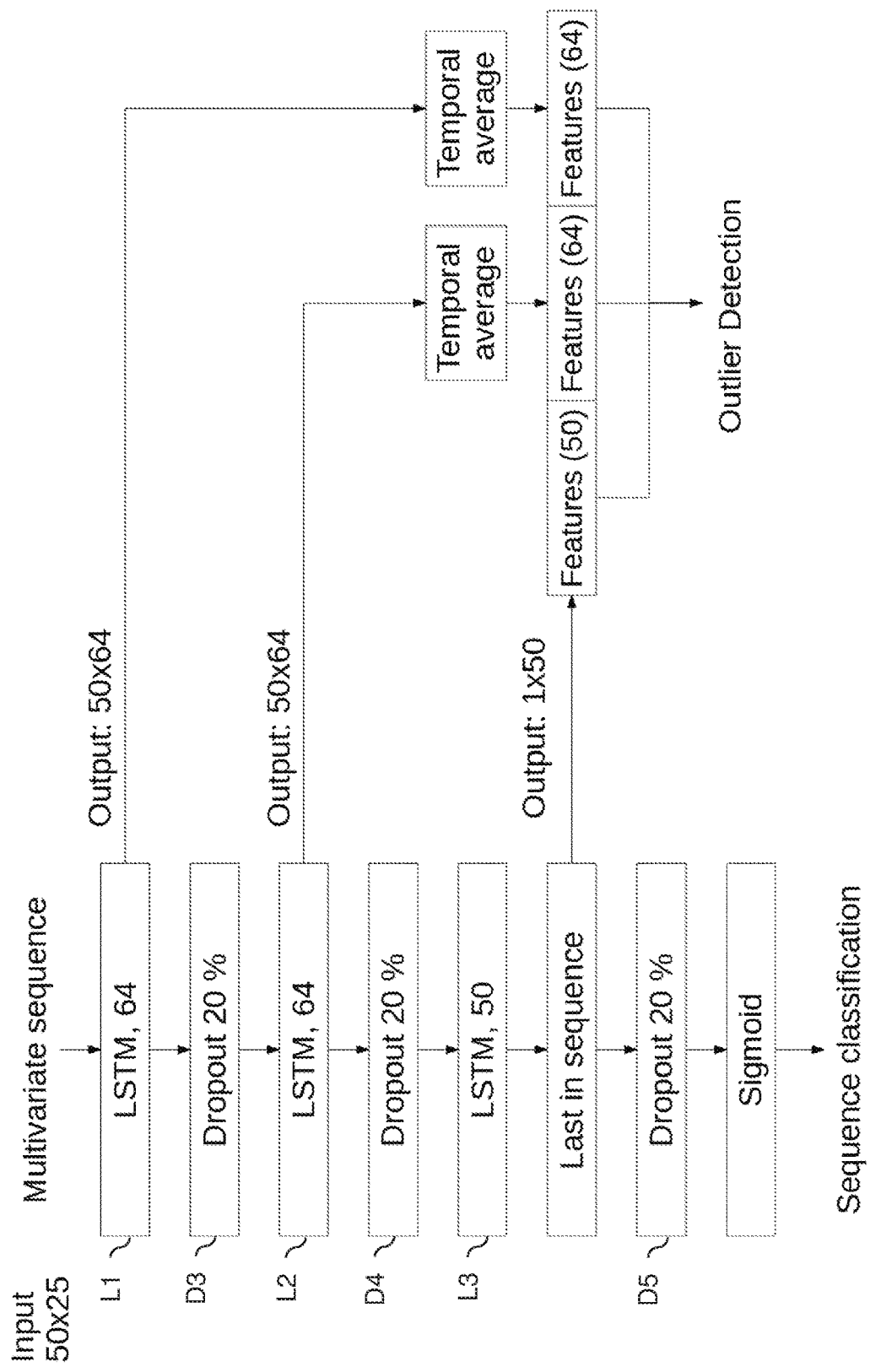
FIG. 12 shows an exemplary network architecture used for a predictive maintenance model and exemplary features extracted for outlier detection.

FIG. 12 shows an exemplary configuration of the LSTM-model (an example of the deep neural network 100) trained for predicting failure using the Turbofan Engine Degradation dataset in this experiment. The LSTM-model shown in FIG. 12 comprises three LSTM-layers L1, L2, L3 and an output layer with a sigmoid function as the activation function. The LSTM-layers L1 and L2 respectively comprise 64 LSTM blocks and the LSTM layer L3 comprises 50 LSTM blocks. The LSTM-layers L1, L2, L3 may be considered as the hidden layers of the deep neural network 100. To train the LSTM-model shown in FIG. 12, sliding windows that were 50 cycles long was used as input and a binary response indicating whether or not the last cycle of the sliding window is within 15 cycles away from a failure. The 21 sensor outputs, the 3 control settings and the current cycle from the beginning were used as variables for failure prediction. All variables were scaled to range 0-1, and the scaling parameters for the training data were used for scaling the test data.

To monitor training progression, 10% of the training dataset was used for validation. The LSTM model was trained until binary cross entropy for the validation set stopped increasing (eight epochs) using the Adam optimizer (Kingma, Diederik P., and Jimmy Ba. "Adam: A Method for Stochastic Optimization." ArXiv:1412.6980 [Cs], Dec. 22, 2014, Available: http://arxiv.org/abs/1412.6980 [Accessed: 25 Jul. 2018]). The resulting model achieved a test-set F1-score of 94.1% at sliding window classification. The test-set performance of the predictive maintenance model is summarized in the following Table 2.

TABLE 2

Summary of test-set performance of the predictive maintenance model

| Metric | Test set score |
| --- | --- |
| Accuracy | 0.968 |
| Precision | 0.923 |
| Recall | 0.96 |
| F1-score | 0.941 |

To simulate prediction time outliers where a sensor stops working, half of the test set engines were randomly chosen to serve as outliers. For each of these engines, a sensor was randomly chosen and its output was set to zero starting at the middle of the full time sequence. To provide a latent variable model for detecting these outliers, features (e.g., intermediate outputs) were extracted from the LSTM-layers L1, L2, L3 of the predictive maintenance model (see FIG. 12). For the first two LSTM-layers L1, L2, the average across time for each LSTM-node was used to summarize each sliding window. For the last LSTM-layer L3, simply the last cycle in the time sequence was used. The output from the three LSTM-layers L1, L2, L3 were then concatenated into a single matrix.

An outlier detection module was set up based on PCA, where a 100-component PCA-model was fit on all the training data LSTM-features. The approximation residual sum-of-squares was calculated for all training set sliding windows, and the 99.9th percentile of training residual sum-of-squares was set as cutoff for outliers. Then the outlier and remaining test-set LSTM-features were projected on the PCA-model and the approximation residual sum-of-squares was calculated for all sliding windows, as can be seen from FIG. 13. Thus, the methods and systems as described herein may be used in addition to the predictive maintenance model to handle detection and management of outliers. While the predictive maintenance model is accurate at the task it has been trained for, this model cannot handle unexpected events such as sensor breakage (which is not engine breakage).

Figure 13:
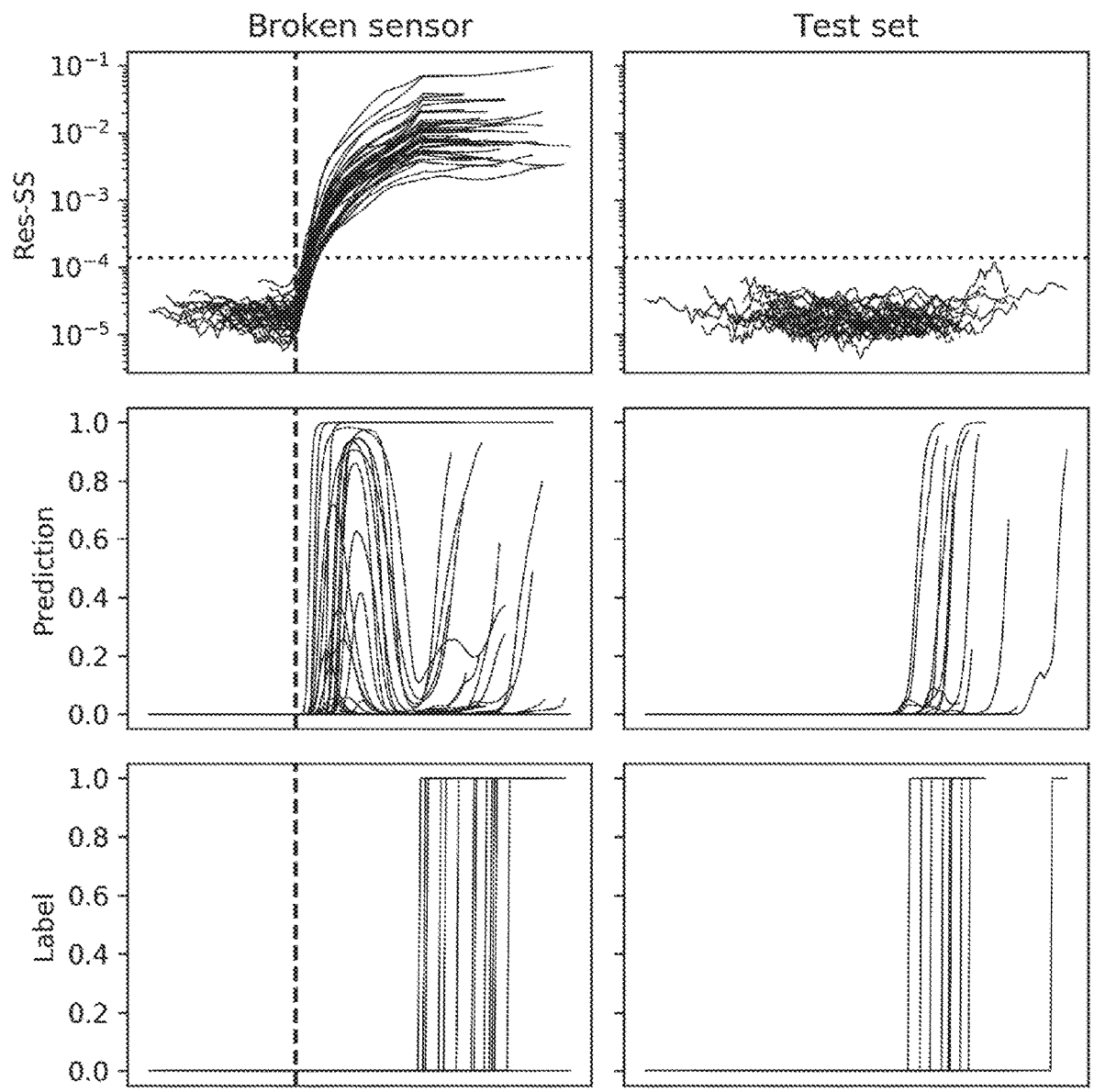
FIG. 13 shows outlier detection on test set sequences for predictive maintenance.

FIG. 13 shows results of outlier detection on test set sequences for predictive maintenance. The left side of FIG. 13 shows sequences where one random sensor breaks aligned at sensor breakage (vertical dashed line indicating when sensor broke) and the right side of FIG. 13 shows test set without sensor breakage aligned at middle time point. Top row figures in FIG. 13 show residual sum-of-squares for outlier detection, horizontal dashed line indicating the 99.9th percentile based on training set distances. Middle row figures in FIG. 13 show the model's prediction if the turbine is going to break within 15 cycles, where 1 means that the engine is predicted to fail. Bottom row figures in FIG. 13 show the labels indicating if the turbine is going to break within 15 cycles, where 1 means that the engine is going to fail. Outliers were successfully distinguished from normal variation (precision=recall=1 for this experiment). Following sensor breakage, the LSTM-model predict that many of the engines are going to break but the residual sum-of-squares increase simultaneously. For the test set, the model predicts engine failure correctly while the residual sum-of-squares does not increase. This shows that by using the present method it is possible to distinguish between predictions that should not be trusted and those that should be. It also shows that the present method is applicable not only to feed-forward networks, but also to recurrent networks.

Figure 14:
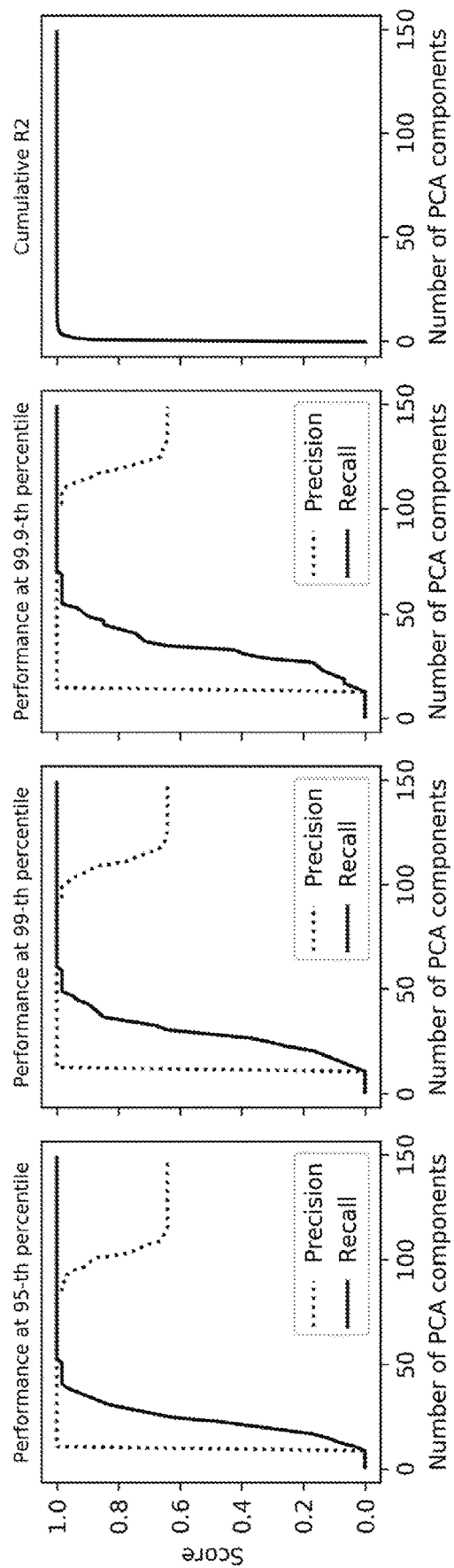
FIG. 14 shows evaluation of outlier detection performance for predictive maintenance depending on number of PCA components and cutoff-percentile.

Further, how the number of components and residual sum-of-squares influence the results was explored. The number of components was varied from 1 to 150 and the precision and recall for outlier detection were reported using the 95th, 99th and 99.9th percentiles of training set residual sum-of-squares as cutoff, as can be seen from FIG. 14. FIG. 14 shows evaluation of outlier detection performance for predictive maintenance depending on number of PCA components and cutoff-percentile. Interestingly, precision and recall of 1 was achieved for all cutoffs but the number of components required to do so increase with stricter cutoffs. For all cutoffs, components with very small explained variation is required to achieve high precision and recall (99.99% cumulative R2 is reached after only 36 components). This shows that the variation that differ between outliers and normal test set sequences are small nuances that require very small PCA components to be captured. At all cutoffs, overfitting was observed with reduced precision when the number of components becomes too large. At stricter cutoffs, however, a larger number of components is tolerated before over-fitting occurs. In this experiment, a PCA model explaining 99.999% of the training LSTM-feature variation provides a good basis for outlier detection with precision and recall of 1 at both 99th and 99.9th percentile cutoff.
Variations In the exemplary computing system 1 as described above, activations from a single hidden layer may be used for performing the outlier detection.

In some other examples, activations from two or more hidden layers may be used for performing the outlier detection. For instance, in order to avoid the difficulty in selecting which layer to use for outlier detection, the measures from all (hidden) layers may be combined using Gaussian Kernel Density estimation, which have been used to detect outliers (see e.g., L. J. Latecki, A. Lazarevic, and D. Pokrajac, "Outlier Detection with Kernel Density Functions," in Machine Learning and Data Mining in Pattern Recognition, 2007, pp. 61-75; E. Schubert, A. Zimek, and H. Kriegel, "Generalized Outlier Detection with Flexible Kernel Density Estimates," in Proceedings of the 2014 SIAM International Conference on Data Mining, 0 vols., Society for Industrial and Applied Mathematics, 2014, pp. 542-550). Kernel density estimations can be calculated separately for training set Mahalanobis-distances and residual sum of squares, but combining all layers. The probabilities of each image can be approximated under the resulting kernel density functions using Monte Carlo integration. The outlier detection performance can be evaluated in the same manner as in the experiments described above.

Figure 15:
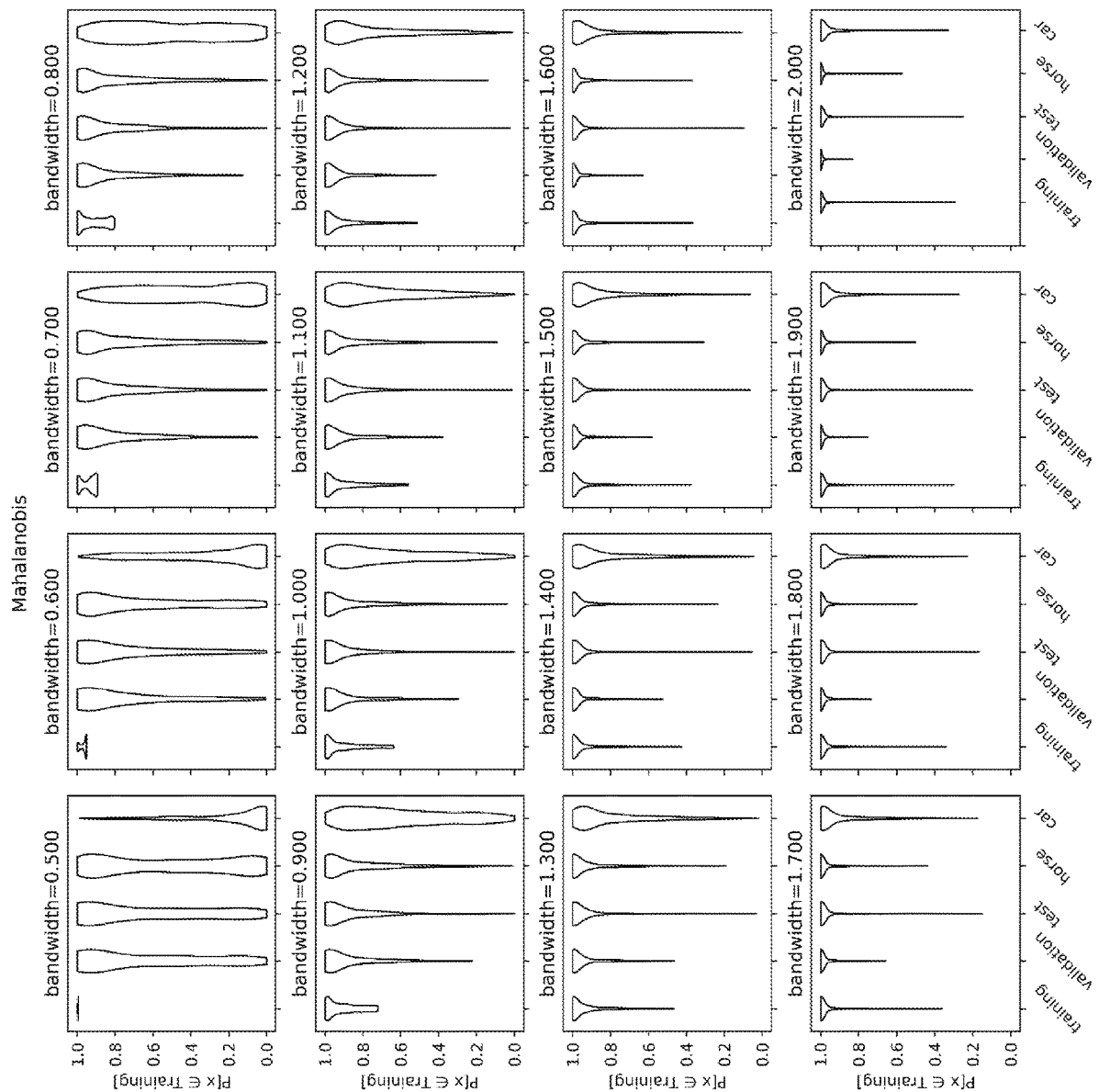
FIG. 15 shows probabilities of different data sets under probability distributions estimated using Gaussian Kernel Densities with different bandwidths merging Mahalanobis distances from all inception outputs from the ImageNet experiment.
Figure 16:
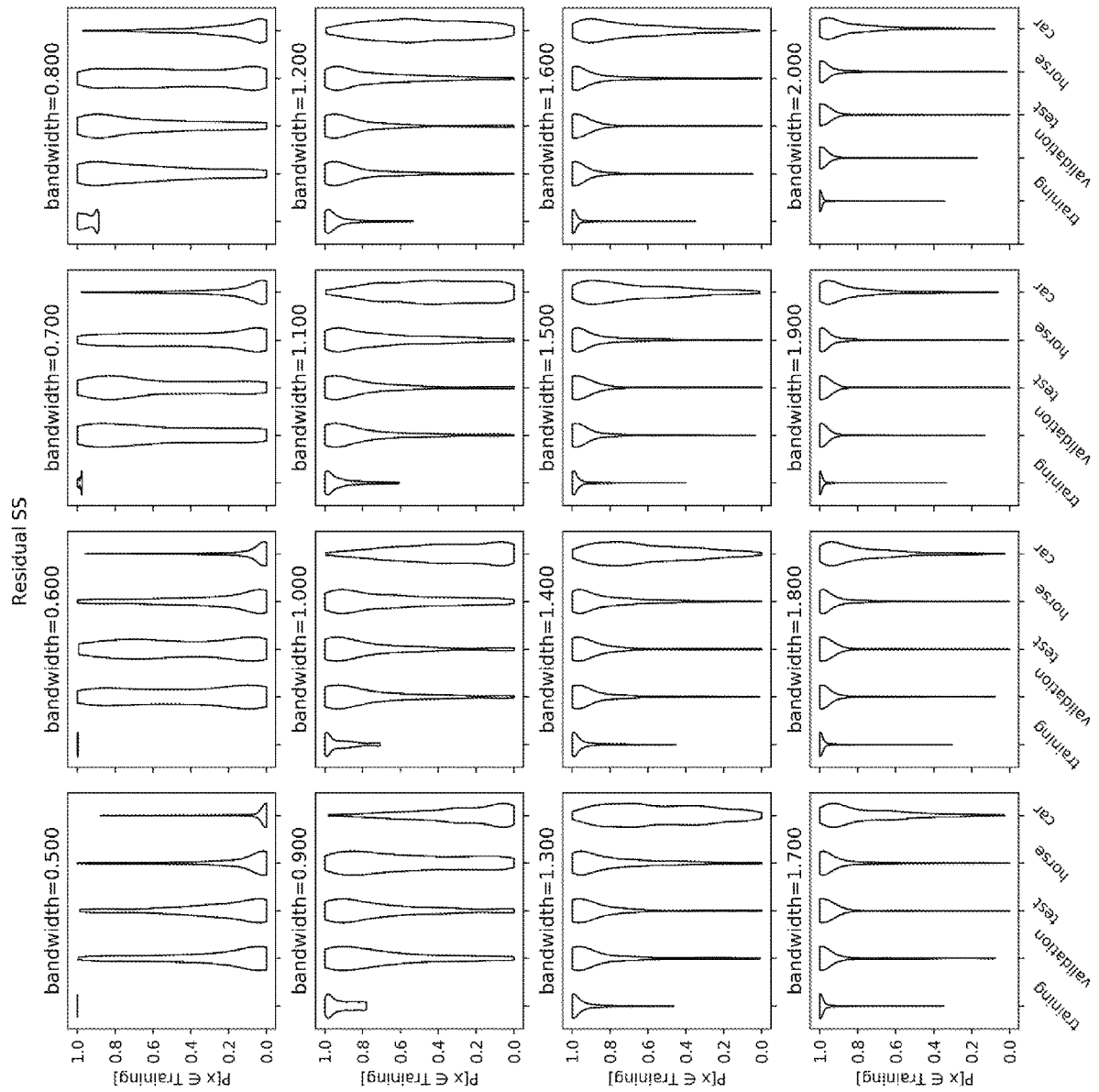
FIG. 16 shows probabilities of different data sets under probability distributions estimated using Gaussian Kernel Densities with different bandwidths merging residual sum of squares from all inception outputs from the ImageNet experiment.
Figure 17:
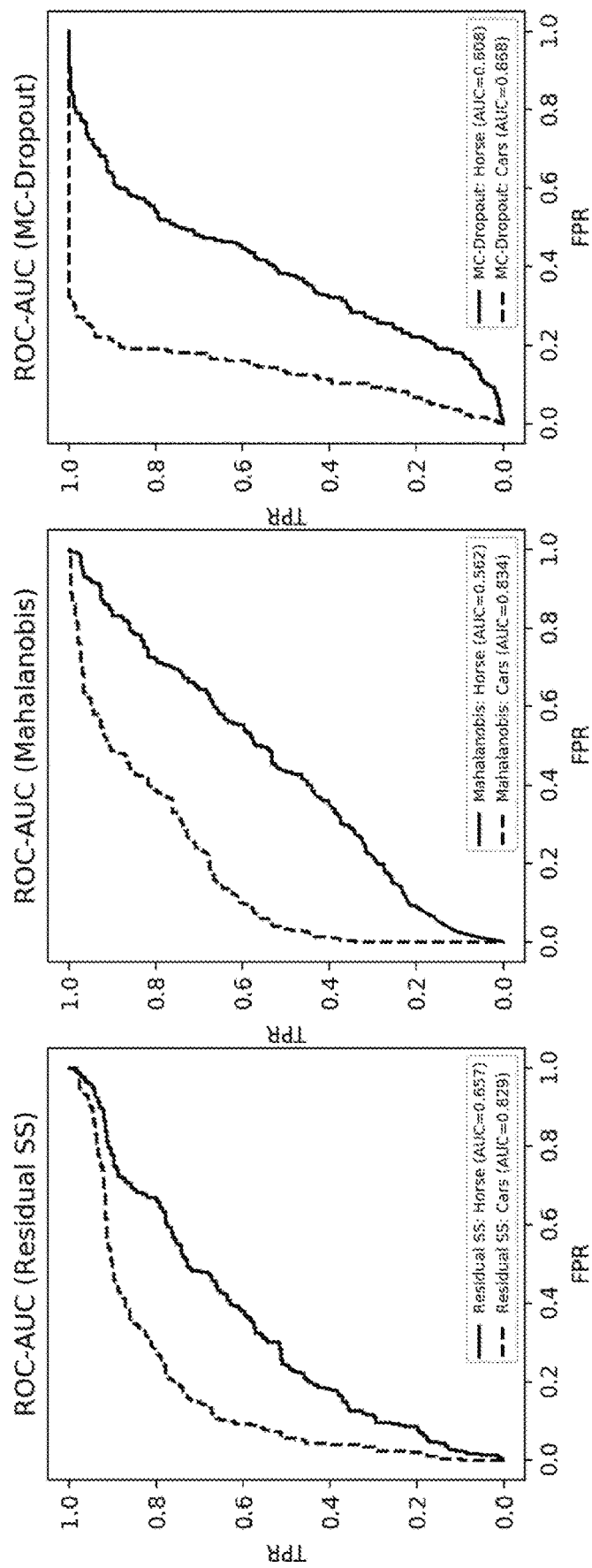
FIG. 17 shows evaluation of the outlier detection performance for weak (Horse) and strong (Cars) outliers from the ImageNet dataset.

FIGS. 15 to 17 show experimental results of combining the measures of all the hidden layers using Gaussian Kernel Density estimation. More specifically, FIG. 15 shows probabilities of the different data sets under the probability distributions estimated using Gaussian Kernel Densities with different bandwidths merging Mahalanobis distances from all inception outputs from the ImageNet experiment. FIG. 16 shows Probabilities of the different data sets under the probability distributions estimated using Gaussian Kernel Densities with different bandwidths merging residual sum of squares from all inception outputs from the ImageNet experiment. Further, FIG. 17 shows evaluation of the outlier detection performance for weak (Horse) and strong (Cars) outliers from the ImageNet dataset. The ROC-curves are calculated distinguishing the test set to the outlier sets using either residual sum of squares or Mahalanobis distances from inception outputs merged using Kernel Density, or prediction entropy when using MC-dropout.

From FIGS. 15 to 17, it can be seen that both strong and weak outliers are successfully detected. The results using residual sum-of-squares are comparable to using the dropout-based approach.

In further examples, when integrating several embeddings (e.g., activations from several layers) a bagging approach (see e.g., A. Lazarevic and V. Kumar, "Feature Bagging for Outlier Detection," in Proceedings of the Eleventh ACM SIGKDD International Conference on Knowledge Discovery in Data Mining, New York, NY, USA, 2005, pp. 157-166) may be used instead of direct kernel density.

Further, it may be possible to use other methodologies on learned representations, GMM one-class SMV, clustering, etc.

Further, in various embodiments and examples described herein, instead of using simple measure such as Mahalanobis distance, a more localized measures such as Local Outlier Factor (see e.g., M. M. Breunig, H.-P. Kriegel, R. T. Ng, and J. Sander, "LOF: Identifying Density-based Local Outliers," in Proceedings of the 2000 ACM SIGMOD International Conference on Management of Data, New York, NY, USA, 2000, pp. 93-104) may be applied directly in PCA space.

The methods and systems as described herein may be applied to phase microscopy image analysis. The task of identifying nuclei from phase contrast images is challenging and typically relies on fluorescent markers binding to nuclei to provide an extra image channel highlighting locations of nuclei. By applying deep CNN:s, a model may be generated and trained that segments background from cells as well as identifies nuclei of cells from phase contrast images without using fluorescence labels. If the CNN is trained on phase contrast images from multiple cell types, the CNN may also identify new previously unseen cell types. In order to determine when unseen cell types are too different from the cell types used for CNN training, prediction time outlier detection may be applied. If phase microscopy images from new cell types are detected as outliers, the user may receive a warning that the CNN:s separation of cell and background as well as detection of nuclei are unreliable. In this case, the CNN system provided may send a signal that the CNN model needs to be re-trained in order to reliably separate cells from background and identify nuclei from phase contrast images for the new cell type.

Hardware Configuration

Figure 18:
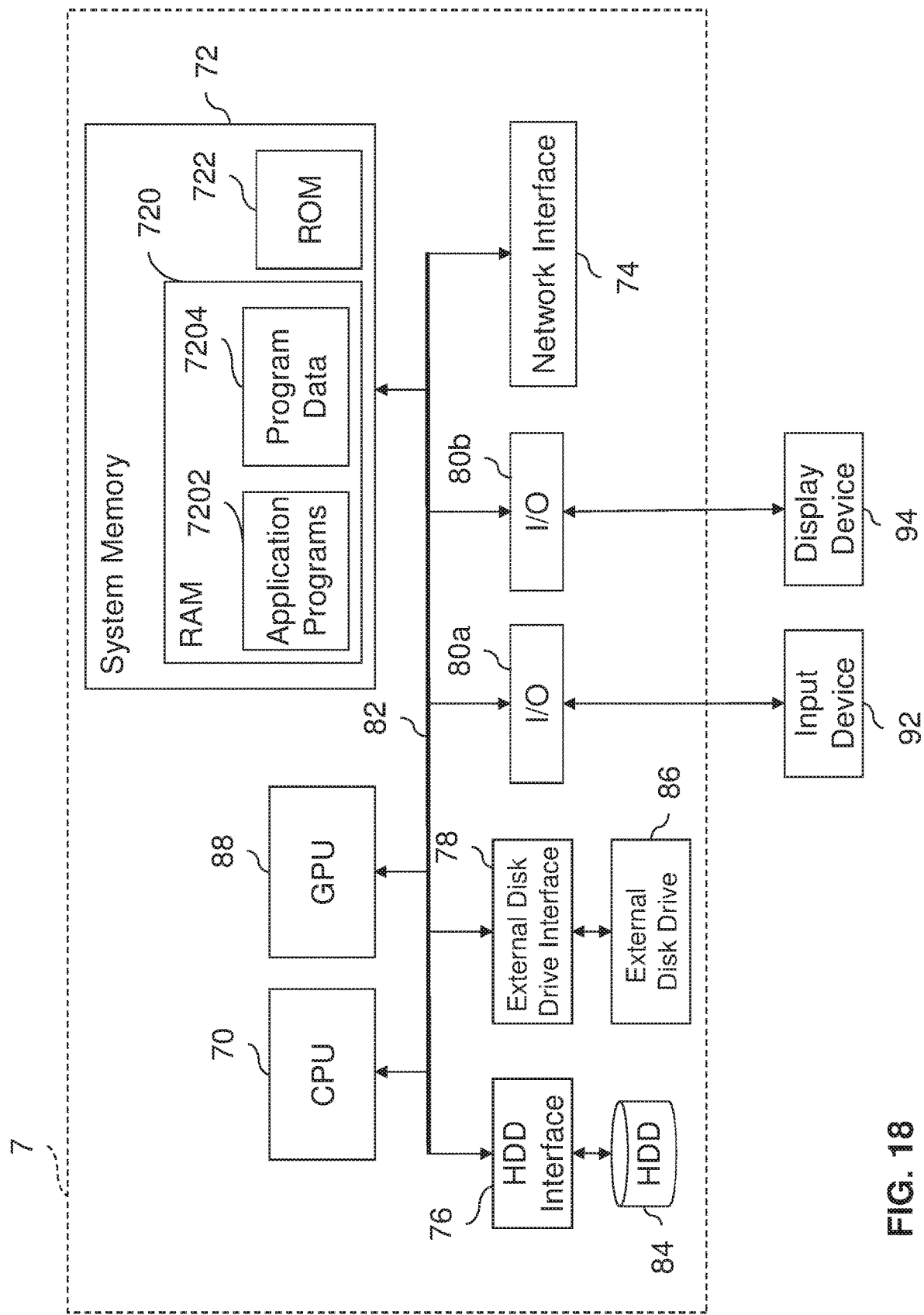
FIG. 18 shows an exemplary hardware configuration of a computer that may be used to implement at least a part of the system described herein.

FIG. 18 shows an exemplary hardware configuration of a computer that may be used to implement at least a part of the computing system 1 as described above. The computer 7 shown in FIG. 16 includes a central processing unit (CPU) 70, a graphics processing unit (GPU) 88, a system memory 72, a network interface 74, a hard disk drive (HDD) interface 76, an external disk drive interface 78 and input/output (I/O) interfaces 80. These components of the computer are coupled to each other via a system bus 82. The CPU 70 may perform arithmetic, logic and/or control operations by accessing the system memory 72. The GPU 88 may perform processing concerning graphic images and/or matrix operations required for deep learning. The GPU 88 may comprise a plurality of processors (e.g., cores) that can perform parallel processing, which may lead to higher performance of the computing system 1. The CPU 70 and/or GPU 88 may implement the processors of the exemplary devices and/or system described above. In some examples, however, the computer 7 does not necessarily comprise the GPU 88. The system memory 72 may store information and/or instructions for use in combination with the CPU 70. The system memory 72 may include volatile and non-volatile memory, such as a random access memory (RAM) 720 and a read only memory (ROM) 722. A basic input/output system (BIOS) containing the basic routines that helps to transfer information between elements within the computer 7, such as during start-up, may be stored in the ROM 722. The system bus 82 may be any of several types of bus structures including a memory bus or memory controller, a peripheral bus, and a local bus using any of a variety of bus architectures. The CPU 70 may be further connected to one or more sensors (not shown) via one or more corresponding interfaces (not shown) and the bus 82. The sensors may measure physical conditions or states including but not limited to: temperature, pH, pressure, etc. Additionally, the sensors may include other types of measuring or detecting devices including but not limited to imaging devices, microphones, spectral sensors, etc. Controllers may control a physical condition or state including but not limited to: temperature, flux, stirring, etc.

The computer may include a network interface 74 for communicating with other computers and/or devices via a network.

Further, the computer may include a hard disk drive (HDD) 84 for reading from and writing to a hard disk (not shown), and an external disk drive 86 for reading from or writing to a removable disk (not shown). The removable disk may be a magnetic disk for a magnetic disk drive or an optical disk such as a CD ROM for an optical disk drive. The HDD 84 and the external disk drive 86 are connected to the system bus 82 by a HDD interface 76 and an external disk drive interface 78, respectively. The drives and their associated computer-readable media provide non-volatile storage of computer-readable instructions, data structures, program modules and other data for the general purpose computer. The data structures may include relevant data for the implementation of the exemplary method and its variations as described herein. The relevant data may be organized in a database, for example a relational or object database.

Although the exemplary environment described herein employs a hard disk (not shown) and an external disk (not shown), it should be appreciated by those skilled in the art that other types of computer readable media which can store data that is accessible by a computer, such as magnetic cassettes, flash memory cards, digital video disks, random access memories, read only memories, and the like, may also be used in the exemplary operating environment.

A number of program modules may be stored on the hard disk, external disk, ROM 722 or RAM 720, including an operating system (not shown), one or more application programs 7202, other program modules (not shown), and program data 7204. The application programs may include at least a part of the functionality as described above.

The computer 7 may be connected to an input device 92 such as mouse and/or keyboard and a display device 94 such as liquid crystal display, via corresponding I/O interfaces 80a and 80b as well as the system bus 82. In case the computer 7 is implemented as a tablet computer, for example, a touch panel that displays information and that receives input may be connected to the computer 7 via a corresponding I/O interface and the system bus 82. Further, in some examples, although not shown in FIG. 18, the computer 7 may further be connected to a printer and/or an imaging device such as a camera, via corresponding I/O interfaces and the system bus 82.

In addition or as an alternative to an implementation using a computer 7 as shown in FIG. 18, a part or all of the functionality of the exemplary embodiments described herein may be implemented as one or more hardware circuits. Examples of such hardware circuits may include but are not limited to: Large Scale Integration (LSI), Reduced Instruction Set Circuits (RISC), Application Specific Integrated Circuit (ASIC) and Field Programmable Gate Array (FPGA).

Glossary

ASIC Application Specific Integrated Circuit
BIOS basic input/output system
CD ROM Compact Disc Read-Only Memory
CNN convolutional neural network
CPU central processing unit
DNN deep neural network
GPU graphics processing unit
FPGA Field Programmable Gate Array
HDD hard disk drive
HTTP hypertext transfer protocol
I/O input/output
KBE
LSI Large Scale Integration
MC-dropout Monte Carlo dropout
MNIST Modified National Institute of Standards and Technology
PCA Principal Component Analysis
RAM random access memory
ReLu rectified linear unit
RISC Reduced Instruction Set Circuits
ROC-AUC Receiver-Operating-Characteristic Area-Under-Curve
ROM read only memory
SSH Secure Shell

The invention claimed is:

1. A computer-implemented method for evaluating reliability of prediction given by a deep neural network for an observation input to the deep neural network, the deep neural network comprising a plurality of hidden layers and being trained based on a training dataset including training observations that are input to the deep neural network, the method comprising:
   obtaining the deep neural network and at least a part of the training dataset used for training the deep neural network;
   obtaining first sets of intermediate output values that are output from at least one of the plurality of hidden layers of the deep neural network, each of the first sets of intermediate output values obtained by inputting a different one of the observations included in said part of the training dataset;
   constructing, via at least one processor, a latent variable model using the first sets of intermediate output values that are output from at least one of the plurality of hidden layers of the deep neural network, the latent variable model providing a mapping of the first sets of intermediate output values that are output from at least one of the plurality of hidden layers of the deep neural network to first sets of projected values in a sub-space that has a dimension lower than a dimension of the first sets of the intermediate output values that are output from at least one of the plurality of hidden layers of the neural network;
   receiving a new observation to be input to the deep neural network;
   obtaining a prediction given by the deep neural network for the new observation;
   obtaining a second set of intermediate output values that are output from at least one of said plurality of hidden layers of the deep neural network by inputting the received new observation to the deep neural network;
   mapping, using the latent variable model, the second set of intermediate output values to a second set of projected values;
   determining, via the processor, whether the received new observation is an outlier with respect to the training dataset based on the latent variable model and the second set of projected values; and
   determining, via the processor, whether the prediction for the new observation given by the deep neural network is a reliable prediction, wherein the prediction for the new observation is determined to be unreliable if the new observation is determined to be an outlier and the prediction for the new observation is determined to be reliable if the new observation is determined not to be an outlier.

2. The method according to claim 1, wherein the latent variable model is constructed according to principal component analysis.

3. The method according to claim 1, wherein determining whether the received new observation is an outlier comprises:
   calculating a Mahalanobis distance of the second set of projected values with respect to a distribution of the first sets of projected values; and
   determining that the received new observation is an outlier with respect to the training dataset when the calculated Mahalanobis distance is larger than a threshold value for the Mahalanobis distance.

4. The method according to claim 3, wherein the threshold value for the Mahalanobis distance is determined based on Mahalanobis distances, each of which is calculated for a different one of the first sets of projected values with respect to the distribution of the first sets of projected values.

5. The method according to claim 1, wherein determining whether the received new observation is an outlier comprises:
   determining an approximate set of intermediate output values corresponding to the second set of intermediate output values, using the latent variable model and the second set of projected values;
   calculating a squared approximation residual for the second set of intermediate output values and the approximate set of intermediate output values; and
   determining that the received new observation is an outlier with respect to the training dataset when the calculated squared approximation residual is larger than a threshold value for the squared approximation residual.

6. The method according to claim 5, wherein the threshold value for the squared approximation residual is determined based on squared approximation residuals, each of which is calculated for a different one of the first sets of intermediate output values and the approximate set of intermediate output values corresponding to one of said first sets of intermediate output values.

7. The method according to claim 1, wherein obtaining the first sets of intermediate output values and constructing the latent variable model are performed for two or more of the plurality of hidden layers;
   wherein obtaining the second set of intermediate output values and mapping the second set of intermediate output values to the second set of projected values are performed for said two or more of the plurality of hidden layers; and
   wherein determining whether the received new observation is an outlier is performed based on the latent variable model and the second set of projected values obtained for said two or more of the plurality of hidden layers.

8. A computer-implemented method for evaluating reliability of prediction given by a deep neural network for a new observation input to the deep neural network, the deep neural network comprising a plurality of hidden layers and being trained based on a training dataset including observations that are input to the deep neural network, the method comprising:
   receiving the new observation to be input to the deep neural network;
   obtaining a prediction given by the deep neural network for the received new observation;
   obtaining a second set of intermediate output values that are output from at least one of the plurality of hidden layers of the deep neural network by inputting the received new observation to the deep neural network;
   mapping, using a latent variable model stored in a storage medium, the second set of intermediate output values to a second set of projected values;
   determining whether the received new observation is an outlier with respect to the training dataset based on the latent variable model and the second set of projected values; and
   determining whether the prediction for the received new observation given by the deep neural network is a reliable prediction, wherein the prediction for the received new observation is determined to be unreliable if the received new observation is determined to be an outlier and the prediction for the received new observation is determined to be reliable if the received new observation is determined not to be an outlier;
   wherein the latent variable model stored in the storage medium is constructed by:
      obtaining first sets of intermediate output values that are output from said one of the plurality of hidden layers of the deep neural network, each of the first sets of intermediate output values obtained by inputting a different one of the observations included in at least a part of the training dataset to the deep neural network; and
      constructing the latent variable model using the first sets of intermediate output values, the latent variable model providing a mapping of the first sets of intermediate output values to first sets of projected values in a sub-space that has a dimension lower than a dimension of the first sets of the intermediate output values.

9. One or more non-transitory computer-readable media comprising computer-readable instructions that, when loaded and run on a computer, cause the computer to:
   obtain a deep neural network for processing data, the deep neural network trained based on a training dataset, and obtain at least a part of a training dataset used for training the deep neural network, the deep neural network comprising a plurality of hidden layers, the training dataset including observations that are input to the deep neural network;
   obtain first sets of intermediate output values that are output from at least one of the plurality of hidden layers of the deep neural network, each of the first sets of intermediate output values obtained by inputting a different one of the observations included in said part of the training dataset to the deep neural network;
   construct, via at least one processor, a latent variable model using the first sets of intermediate output values, the latent variable model providing a mapping of the first sets of intermediate output values to first sets of projected values in a sub-space that has a dimension lower than a dimension of the first sets of the intermediate output values;
   receive a new observation to be input to the deep neural network;
   obtain a prediction given by the deep neural network for the received new observation;
   obtain a second set of intermediate output values that are output from at least one of said plurality of hidden layers of the deep neural network by inputting the received new observation to the deep neural network;
   map, using the latent variable model, the second set of intermediate output values to a second set of projected values;
   determine, via the processor, whether the received new observation is an outlier with respect to the training dataset based on the latent variable model and the second set of projected values; and
   determining whether the prediction for the received new observation given by the deep neural network is a reliable prediction, wherein the prediction for the received new observation is determined to be unreliable if the received new observation is determined to be an outlier and the prediction for the received new observation is determined to be reliable if the received new observation is determined not to be an outlier.

10. A system for evaluating reliability of prediction given by a deep neural network for a new observation input to the deep neural network, the deep neural network comprising a plurality of hidden layers and being trained based on a training dataset including training observations that are input to the deep neural network, the system comprising:
- a storage medium storing a training dataset used for training a deep neural network; and
- a processor configured to:
  - obtain the deep neural network trained using the training dataset;
  - obtain at least a part of the training dataset stored in the storage medium;
  - obtain first sets of intermediate output values that are output from at least one of the plurality of hidden layers of the deep neural network, each of the first sets of intermediate output values obtained by inputting a different one of the observations included in said part of the training dataset;
  - construct a latent variable model using the first sets of intermediate output values, the latent variable model providing a mapping of the first sets of intermediate output values to first sets of projected values in a sub-space that has a dimension lower than a dimension of the first sets of the intermediate output values;
  - receive the new observation to be input to the deep neural network;
  - obtain a prediction given by the deep neural network for the received new observation;
  - obtain a second set of intermediate output values that are output from at least one of said plurality of hidden layers of the deep neural network by inputting the received new observation to the deep neural network;
  - map, using the latent variable model, the second set of intermediate output values to a second set of projected values;
  - determine whether the received new observation is an outlier with respect to the training dataset based on the latent variable model and the second set of projected values and
  - determine, whether the prediction for the received new observation given by the deep neural network is a reliable prediction based on determining, whether the received new observation is an outlier, wherein the prediction for the received new observation is determined to be unreliable if the received new observation is determined to be an outlier and determined reliable if the received new observation is determined not to be an outlier.

11. The system according to claim 10, wherein the latent variable model is constructed according to principal component analysis.

12. The system according to claim 10, wherein, for determining whether the received new observation is an outlier, the processor is further configured to:
- calculate a Mahalanobis distance of the second set of projected values with respect to a distribution of the first sets of projected values; and
- determine that the received new observation is an outlier with respect to the training dataset if the calculated Mahalanobis distance is larger than a threshold value for the Mahalanobis distance.

13. The system according to claim 10, wherein, for determining whether the received new observation is an outlier, the processor is further configured to:
- determine an approximate set of intermediate output values corresponding to the second set of intermediate output values, using the latent variable model and the second set of projected values;
- calculate a squared approximation residual for the second set of intermediate output values and the approximate set of intermediate output values; and
- determine that the received new observation is an outlier with respect to the training dataset if the calculated squared approximation residual is larger than a threshold value for the squared approximation residual.

14. The system according to claim 10, wherein the processor is further configured to:
- obtain the first sets of intermediate output values and construct the latent variable model for two or more of the plurality of hidden layers;
- obtain the second set of intermediate output values and map the second set of intermediate output values to the second set of projected values for said two or more of the plurality of hidden layers; and
- determine whether the received new observation is an outlier based on the latent variable model and the second set of projected values obtained for said two or more of the plurality of hidden layers.

* * * * *